United States Patent
Yang et al.

(10) Patent No.: US 10,482,158 B2
(45) Date of Patent: Nov. 19, 2019

(54) USER-LEVEL KQI ANOMALY DETECTION USING MARKOV CHAIN MODEL

(71) Applicant: Futurewei Technologies, Inc., Plano, TX (US)

(72) Inventors: Kai Yang, Great Neck, NJ (US); Yanjia Sun, Downington, PA (US); Ruilin Liu, Hillsborough, NJ (US); Deti Liu, Plano, TX (US); Jin Yang, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 172 days.

(21) Appl. No.: 15/476,584

(22) Filed: Mar. 31, 2017

(65) Prior Publication Data
US 2018/0285320 A1    Oct. 4, 2018

(51) Int. Cl.
*G06F 17/18* (2006.01)
*G06N 7/00* (2006.01)
(Continued)

(52) U.S. Cl.
CPC .............. *G06F 17/18* (2013.01); *G06N 7/005* (2013.01); *H04W 24/02* (2013.01); *H04W 24/04* (2013.01);
(Continued)

(58) Field of Classification Search
CPC ............ G05B 23/0283; G05B 23/0248; G06F 11/008; G01M 99/005
See application file for complete search history.

(56) References Cited

U.S. PATENT DOCUMENTS 6,278,997 B1   8/2001   Agrawal et al.
6,651,049 B1  11/2003   Agrawal et al.
(Continued)

FOREIGN PATENT DOCUMENTS

CN   101189895 A   5/2008
CN   102143507 A   8/2011
(Continued)

OTHER PUBLICATIONS

3GPP TS 32.450 V13.0.0 (Jan. 2016),3rd Generation Partnership Project;Technical Specification Group Services and System Aspects;Telecommunication management; Key Performance Indicators (KPI) for Evolved Universal Terrestrial Radio Access Network (E-UTRAN): Definitions(Release 13),total 17 pages.
(Continued)

*Primary Examiner* — Elias Desta
(74) *Attorney, Agent, or Firm* — Vierra Magen Marcus LLP

(57) ABSTRACT

Techniques are provided for monitoring the performance of a user device in a communication network. The techniques include detecting an anomaly in a performance measurement such as a key quality indicator (KQI) of the user device. The techniques include obtaining historical measurements of the KQI for user devices. The historical measurements are assigned to states to reflect whether the performance is good or bad, or somewhere in between. The states can be defined differently for different hours in the day so that the states represent the relative performance for that time of day. For each user device, a Markov model is provided indicating probabilities of transitions between the states. Additional measurements are obtained of the KQI for a selected user device, and the Markov model of the selected user device is used to detect an anomaly in the additional measurements.

20 Claims, 16 Drawing Sheets

(51) Int. Cl.
*H04W 24/02* (2009.01)
*H04W 24/04* (2009.01)
*H04W 24/08* (2009.01)
*H04W 36/00* (2009.01)

(52) U.S. Cl.
CPC ........ *H04W 24/08* (2013.01); *H04W 36/0022* (2013.01)

(56) References Cited

U.S. PATENT DOCUMENTS

| | | | |
|---|---|---|---|
| 8,775,341 B1* | 7/2014 | Commons | G06N 3/0454 706/20 |
| 9,152,918 B1* | 10/2015 | McNair | G06N 7/005 |
| 9,258,200 B2 | 2/2016 | Wan et al. | |
| 9,542,532 B1 | 1/2017 | McNair et al. | |
| 2002/0022952 A1 | 2/2002 | Zager et al. | |
| 2003/0130991 A1 | 7/2003 | Reijerse et al. | |
| 2007/0263539 A1 | 11/2007 | Lonnqvist et al. | |
| 2009/0024551 A1 | 1/2009 | Agrawal et al. | |
| 2009/0192867 A1 | 1/2009 | Farooq et al. | |
| 2009/0052330 A1 | 2/2009 | Matsunaga et al. | |
| 2009/0165078 A1 | 6/2009 | Samudrala et al. | |
| 2015/0049634 A1 | 2/2015 | Levchuk et al. | |
| 2015/0074035 A1 | 3/2015 | Narasappa | |
| 2015/0134622 A1 | 5/2015 | Ebel et al. | |
| 2016/0105801 A1* | 4/2016 | Wittenberg | H04W 4/029 455/411 |
| 2016/0162346 A1 | 6/2016 | Kushnir et al. | |
| 2016/0292611 A1 | 10/2016 | Boe et al. | |
| 2016/0344606 A1 | 11/2016 | Baccarani | |
| 2016/0350173 A1 | 12/2016 | Ahad | |

FOREIGN PATENT DOCUMENTS

| | | |
|---|---|---|
| CN | 103024793 A | 4/2013 |
| CN | 105099759 A | 11/2015 |
| WO | WO2016093836 A1 | 6/2016 |
| WO | 2017016492 A1 | 2/2017 |

OTHER PUBLICATIONS

PCT/CN2018/079421, ISR, dated Jun. 11, 2018, 9 pages.
Batteram, Harold, et al., "Delivering quality of experience in multimedia networks," Bell Labs Technical Journal 15.1, Jun. 2010, pp. 175-193.
Toube, Hideki, et al., "Problems and feasibility consideration of Service-forcused Monitoring OSS over mobile networks," 14th Asia-Pacific Network Operations and Management Symposium (APNOMS), Sep. 2012, 4 pages.
Non-final Office Action dated Aug. 16, 2018, U.S. Appl. No. 15/069,617, filed Mar. 14, 2016.
Karatepe, Ilyas Alper, et al., "Anomaly Detection in Cellular Network Data Using Big Data Analysis," Proceedings of European Wireless Conference, May 2014, 5 pages.
Grinstead, Charles, et al., "Chapter 11—Markov Chains," Introduction to Probability, American Mathematical Society, Jul. 1997, 66 pages.
Combo, "Monitoring parameters relation to QoS/QoE and KPls," Version V2.0, Jun. 2014, 50 pages.
The PAM Clustering Algorithm, [www.cs.umb.edu/cs738/pam1.pdf], Apr. 2010, 4 pages.
Soldani, Dr. David, "QoE and QoS Monitoring and data analyses," Powerpoint, Special Course on Networking Technology, Helsinki University of Technology, Nov. 2006, 56 pages.
Non-final Office Action dated Jan. 2, 2019, U.S. Appl. No. 15/186,346, filed Jun. 17, 2016.
Response to Office Action dated Dec. 17, 2018, U.S. Appl. No. 15/069,617, filed Mar. 14, 2016.
English Abstract of Chinese Publication No. CN102143507 published Aug. 3, 2011.
English Abstract of Chinese Publication No. CN103024793 published Apr. 3, 2013.
Notice of Allowance dated Feb. 12, 2019, U.S. Appl. No. 15/069,617, filed Mar. 14, 2016.
Response to Office Action dated Apr. 1, 2019, U.S. Appl. No. 15/186,346, filed Jun. 17, 2016.

* cited by examiner

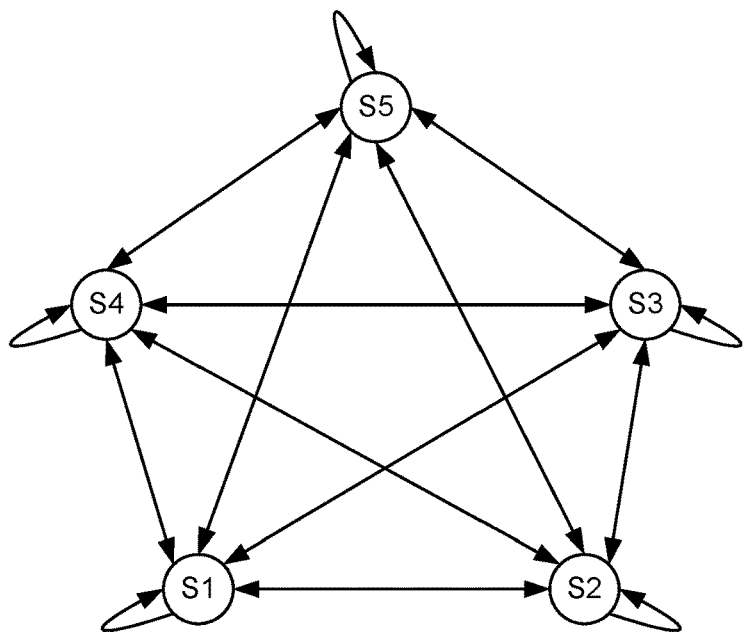
Fig. 6A
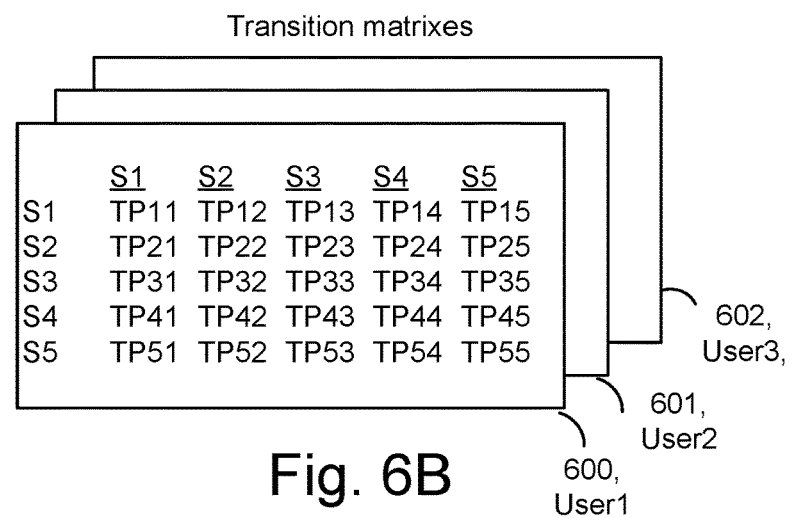
Fig. 6B
$$P_{ij} = \frac{\sum_t X_{ij}(t,t+1)}{\sum_t \sum_k X_{ik}(t,t+1)} X_{ij}(t,t+1) = 1,$$
Fig. 6C KQI1 data

| Index | Date | H:Min. | Sec. | KQI1 | State | Event ProbWS3 | log(Event ProbWS3) | Event Label |
|---|---|---|---|---|---|---|---|---|
| 1 | 20151225 | 0:02 | 38 | 1437 | S5 | n/a | n/a | 0 |
| 2 | 20151225 | 0:03 | 48 | 639 | S5 | n/a | n/a | 0 |
| 3 | 20151225 | 0:04 | 16 | 1488 | S5 | 0.503 | -0.687 | 0 |
| 4 | 20151225 | 0:05 | 30 | 2107 | S5 | 0.503 | -0.687 | 0 |
| 5 | 20151225 | 0:09 | 42 | 1474 | S5 | 0.503 | -0.687 | 0 |
| 6 | 20151225 | 0:09 | 43 | 1488 | S5 | 0.503 | -0.687 | 0 |
| 7 | 20151225 | 0:09 | 44 | 3793 | S5 | 0.503 | -0.687 | 0 |
| 8 | 20151225 | 0:09 | 57 | 1723 | S5 | 0.503 | -0.687 | 0 |
| 9 | 20151225 | 0:10 | 12 | 4296 | S5 | 0.503 | -0.687 | 0 |
| 10 | 20151225 | 0:10 | 31 | 2857 | S5 | 0.503 | -0.687 | 0 |
| 11 | 20151225 | 0:13 | 43 | 2093 | S5 | 0.503 | -0.687 | 0 |
| 12 | 20151225 | 0:14 | 10 | 2829 | S5 | 0.503 | -0.687 | 0 |
| 13 | 20151225 | 0:16 | 33 | 1360 | S5 | 0.503 | -0.687 | 0 |
| 14 | 20151225 | 0:16 | 48 | 1217 | S5 | 0.503 | -0.687 | 0 |
| 15 | 20151225 | 0:20 | 38 | 113 | S5 | 0.503 | -0.687 | 0 |
| 16 | 20151225 | 0:23 | 40 | 39 | S3 | 0.503 | -0.687 | 0 — 801 |
| 17 | 20151225 | 0:25 | 14 | 34 | S2 | 0.015 | -4.161 | 0 |
| 18 | 20151225 | 0:35 | 13 | 76 | S4 | 0.00456 | -5.389 | 1 |
| 19 | 20151225 | 0:35 | 52 | 35 | S2 | 0.00064 | -7.348 | 1 |
| 20 | 20151225 | 0:36 | 01 | 52 | S3 | 0.00618 | -5.086 | 1 |
| 21 | 20151225 | 0:49 | 26 | 74 | S4 | 0.03067 | -3.484 | 0 |
| 22 | 20151225 | 0:50 | 22 | 57 | S3 | 0.1472 | -1.916 | 0 |
| 23 | 20151225 | 0:53 | 23 | 115 | S5 | 0.294 | -1.223 | 0 |
| ... | | | | | | | | |

Fig. 8      800

$$P(e) = \sqrt[N]{\prod_{t=1}^{t=N} P_t}$$

Fig. 10

| Index | Date | H:Min. Sec. | KQI1 | State | Event ProbWS3 | log(Event ProbWS3) | Event Label |
|---|---|---|---|---|---|---|---|
| 1 | 20151230 | 13:57 01 | 211 | S4 | 0.293 | -1.227 | 0 |
| 2 | 20151230 | 13:57 15 | 218 | S4 | 0.293 | -1.227 | 0 |
| 3 | 20151230 | 14:05 08 | 142 | S3 | n/a | n/a | 0 |
| 4 | 20151230 | 14:05 10 | 66 | S2 | 0.617 | -2.785 | 1 |
| 5 | 20151230 | 16:33 19 | 241 | S4 | n/a | n/a | 0 |

Fig. 11            1100

USER-LEVEL KQI ANOMALY DETECTION USING MARKOV CHAIN MODEL

BACKGROUND

The performance of a communication network such as a cellular network is affected by factors such as the data and voice traffic load, the RF coverage, the level of inter-cell interference, the location of user devices and hardware failures. Data such as throughput and delay can be collected and aggregated for a group of user devices at the network level to monitor the performance of the network. However, monitoring the performance of an individual user device is more problematic. For example, the performance of an individual user device can vary more frequently and unpredictably compared to the performance of a group of user devices. Techniques used for monitoring performance and detecting anomalies at the group level may be less effective than at the level of an individual user device.

BRIEF SUMMARY

According to one aspect of the present disclosure, there is provided a device comprising a non-transitory memory storage comprising instructions, and one or more processors in communication with the memory, wherein the one or more processors execute the instructions to: obtain historical measurements of a key quality indicator for one or more user devices including a selected user device in a communication network; assign the historical measurements to a plurality of states, one state per measurement; for the selected user device, determine stationary probabilities and transition probabilities of the states; obtain additional measurements of the key quality indicator for the selected user device; and use the stationary probabilities and transition probabilities of the selected user device to detect an anomaly in the additional measurements.

Optionally, in the preceding aspect, another implementation of the aspect provides that the one or more processors execute the instructions to: assign the additional measurements to the plurality of states, one state per measurement, to provide a sequence of states; and for each window of multiple windows applied to the sequence of states, determine a probability of a sequence of states in the window and detect whether the anomaly exists for the window based on the probability of the sequence of states in the window.

Optionally, in any of the preceding aspects, another implementation of the aspect provides that the transition probabilities are determined using a Markov model Optionally, in any of the preceding aspects, another implementation of the aspect provides that the windows are overlapping; and each window comprises a sequence of multiple states.

Optionally, in any of the preceding aspects, another implementation of the aspect provides that the one or more processors execute the instructions to: for each window, one of the stationary probabilities is for an initial state of the sequence of states, one or more of the transition probabilities are for reaching one or more subsequent states in the sequence of states in the window, and the probability of the sequence of states in the window is based on the one of the stationary probabilities and the one or more of the transition probabilities.

Optionally, in any of the preceding aspects, another implementation of the aspect provides that the one or more processors execute the instructions to: determine the stationary probabilities of each state based on a number of times the historical measurements for the selected user device are assigned to the state relative to a number of the historical measurements for the selected user device.

Optionally, in any of the preceding aspects, another implementation of the aspect provides that the one or more processors execute the instructions to: for each window, the probability of the sequence of states in the window is based on stationary probabilities of an initial state of the sequence of states and of one or more subsequent states in the sequence of states in the window.

Optionally, in any of the preceding aspects: for each window, the probability of the sequence of states in the window is based on a geometric mean of probabilities of each state of the sequence of states in the window.

Optionally, in any of the preceding aspects: the historical measurements are for a plurality of user devices in the communication network, and the one or more processors execute the instructions to: associate the historical measurements with different times of day, such that each historical measurement is associated with one time of day; form clusters of times with similar historical measurements; and for each cluster, determine a range of the historical measurements and define the plurality of states based on the range, wherein the historical measurements of each cluster are assigned to the plurality of states which are defined for the cluster.

Optionally, in the preceding aspect: for each cluster, the range of the historical measurements is divided into unequal increments and the plurality of states are defined based on the unequal increments.

Optionally, in any of the preceding aspects: the additional measurements are obtained over a time period which is less than a time period over which the historical measurements are obtained.

Optionally, in any of the preceding aspects: the plurality of states represent different quality levels, ranging from a lowest state which represents a lowest quality level to a highest state which represents a highest quality level.

According to another aspect of the present disclosure, there is provided a method for processing data, comprising: obtaining historical measurements of a key quality indicator for a selected user device in a communication network; assigning the historical measurements to a plurality of states, one state per measurement; determining stationary probabilities and transition probabilities for the states; obtaining additional measurements of the key quality indicator for the selected user device; assigning the additional measurements to the plurality of states, one state per measurement, to provide a sequence of states; determining a probability of the sequence of states based on the stationary probabilities and transition probabilities; and determining whether an anomaly has occurred in the additional measurements based on the probability of the sequence of states.

Optionally, in any of the preceding aspects: the probability of the sequence of states is based on a stationary probability of an initial state of the sequence of states and a transition probability for reaching a subsequent state of the sequence of states.

Optionally, in any of the preceding aspects: the sequence of states comprises an initial state and a subsequent state, and the method further comprises: in response to determining that a stationary probability of the subsequent state is less than a threshold, the determining the probability of the sequence of states is based on stationary probabilities of the initial state and the subsequent state.

Optionally, in any of the preceding aspects: the sequence of states comprises an initial state and a subsequent state, and the method further comprises: in response to determining that a stationary probability of the subsequent state is greater than a threshold, the determining the probability of the sequence of states is based on a stationary probability of the initial state and a transition probability for reaching the subsequent state.

Optionally, in any of the preceding aspects: the historical measurements are for a plurality of user devices in the communication network.

According to another aspect of the present disclosure, there is provided a non-transitory computer-readable medium storing computer instructions for accessing data, that when executed by one or more processors, cause the one or more processors to perform the steps of: obtaining measurements of a key quality indicator for a selected user device in a communication network; assigning the measurements to a plurality of states, one state per measurement, to provide a plurality of overlapping sequences of states, wherein the plurality of states are defined based on historical measurements of the key quality indicator for a plurality of user devices in the communication network; determining a probability of each sequence of states; classify the probabilities in anomaly and no-anomaly clusters; and for each sequence of states, determining whether the measurements of the key quality indicator for the selected user device represent an anomalous condition based on whether the probability for the sequence of states is classified into the anomaly or no-anomaly cluster.

Optionally, in any of the preceding aspects: the probability of the sequence of states is based on stationary probability of an initial state of the sequence of states and a transition probability for reaching a subsequent state of the sequence of states.

Optionally, in any of the preceding aspects: the probability of the sequence of states is based on stationary probabilities of an initial state of the sequence of states and of a subsequent state of the sequence of states.

BRIEF DESCRIPTION OF THE DRAWINGS

Aspects of the present disclosure are illustrated by way of example and are not limited by the accompanying figures for which like references indicate elements.

FIG. 6A depicts an example Markov chain having five states, consistent with FIG. 5A-5F.

FIG. 6B depicts tables of transition probabilities consistent with FIG. 6A.

FIG. 6C depicts a formula used to obtain the transition probabilities of FIG. 6B.

FIG. 8 is a table depicting example non-aggregated KQI data for a selected user, where the data is analyzed using a window size=3.

FIG. 10 depicts a formula to determine the probability of an anomaly.

FIG. 11 is a table depicting example non-aggregated KQI data for a selected user, where the data is analyzed using a sequence of two entries.

DETAILED DESCRIPTION

Figure 1:
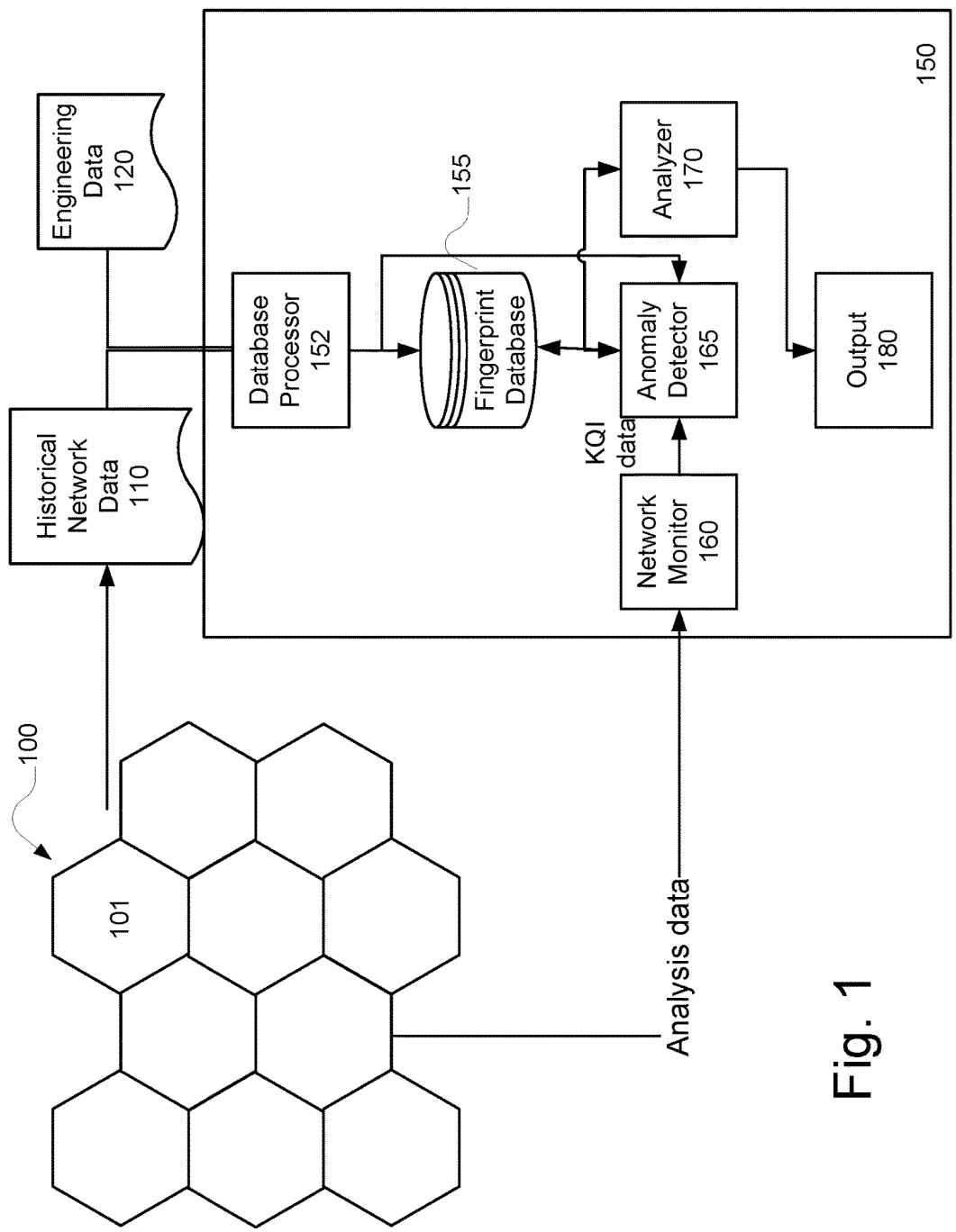
FIG. 1 depicts functional and structural components in an exemplary system in which the present system and method may be implemented.

The disclosure relates to devices and techniques for monitoring the performance of a user device in a communication network. A particular embodiment includes detecting an anomaly in a performance measurement such as a key quality indicator of the user device.

A Key Quality Indicator (KQI) can be used as a measurement of the performance of a user device. Example KQIs include data rate, voice call quality measure, average call failure rate, throughput, web page response time (or display rate), latency, packet loss rate, jitter, call accessibility, call retainability, mobility, data throughput, delay and service availability. KQIs can be used to detect the behavior of a wireless network and evaluate the user experience. In particular, effective and efficient detection of KQI outliers is useful in detecting and diagnosing a problem. KQI outliers are performance measurements which are anomalous or out of the ordinary. For example, a web page display rate which is very low represents an anomaly. Detection and diagnosis of problems is important in improving the user experience and preventing the users from cancelling their accounts and signing up with a competing network.

Some anomaly detection algorithms operate at a relatively rough granularity in terms of their ability to analyze performance. For example, performance may be monitored relatively infrequently, e.g., hourly, rather than minute by minute. Or, performance may be monitored over a relatively large region such as a cell in a cellular network. The behavior of an individual user device may not be accurately reflected by the cell-level KQI which is obtained by aggregating data from the behavior of all user devices in the cell.

User level KQI values usually fluctuate more than cell level KQI values, so that techniques for cell level anomaly detection may not accurately identify anomalous behavior experienced by a particular user.

In some cases, the behavior of a user device may be incorrectly classified as being anomalous. For example, a user device may jump between different servers in the network in a way which results in a bad KQI. However, such behaviors in practice may not adversely impact the user experience and/or may be promptly healed by the network. In other cases, a significant anomalous situation may not be identified.

The techniques provided herein provide user level anomaly detection other than cell level anomaly detection. The techniques can accurately detect outliers from massive amounts of user level data with a refined granularity, while avoiding false detections of anomalous conditions. In one approach, historical KQI or other performance data is gathered for a set of users in a network. The data is aggregated on an hourly or other periodic basis, for instance, and classified into states according to whether the performance is very good or bad, or somewhere in between. Moreover, the states can be defined differently for different hours in the day so that the states represent the relative performance for that time of day. The states are therefore more meaningful. The states reflect time of day-based variations in the network. By gathering historical data for a number of users, a good cross section of data can be obtained with varying performance. A stochastic model, including transition probabilities between states, can be calculated from the historical data for each user. Stationary probabilities for each state can also be calculated from the historical data for each user.

Subsequently, it may be desired to analyze the performance of a selected user. This analysis may be triggered, e.g., based on a complaint by a user or to ensure that the performance of a certain user is good. Raw, non-aggregated performance data is gathered for the user and classified into the states to provide a timewise sequence of states. A moving window is then applied to the sequence and a probability is determined for each windowed portion of the sequence. This is a probability that the sequence of states in the window would occur based on the historical data for the user. If this probability is very low, the sequence of states in the window is considered to represent an anomalous event. The event can be flagged for subsequent analysis. In one approach, the probability is calculated based on the stationary probability of the initial state and the transition probabilities to one or more subsequent states in the window. In another approach, the probability is calculated based on stationary probabilities for each state in the window. This may be used when the frequency with which a state occurs in the historical data is so low that there is insufficient data to calculate a transition probability for the state.

FIG. 1 depicts functional and structural components in an exemplary system in which the present system and method may be implemented. Although only one network is illustrated, multiple networks may be monitored, each having their own performance measurements.

The communication network 100 may comprise any wired or wireless network that provides communication connectivity for devices. The network 100 may include various cellular network and packet data network components (in cells such as cell 101) such as a base transceiver station (BTS), a node-B, a base station controller (BSC), a radio network controller (RNC), a service GPRS support node (SGSN), a gateway GPRS support node (GGSN), a WAP gateway, mobile switching center (MSC), short message service centers (SMSC), a home location registers (HLR), a visitor location registers (VLR), an Internet protocol multimedia subsystem (IMS), and/or the like. The network 100 may employ communication protocols such as Code Division Multiple Access (CDMA), Global System for Mobile communications (GSM), Universal Mobile Telecommunications System (UMTS), Long Term Evolution (LTE), or any other network protocol that facilitates communication between communication network 100 and a network enabled devices. The communication network 100 may also be compatible with future mobile communication standards including, but not limited to, LTE-Advanced and WIMAX-Advanced. The network 100 may include other types of devices and nodes for receiving and transmitting voice, data, and combination information to and from radio transceivers, networks, the Internet, and other content delivery networks. The network may support communication from any portable or non-portable communication device having network connectivity function, such as a cellular telephone, a computer, a tablet, and the like, can operatively connect to the communication network 100.

Key Quality Indicators (KQIs) are generally external indicators that serve as the basis for Quality of Service (QoS) assessment as perceived by the user. Some KQIs are quantifiable and reportable via the network (including the examples provided herein), while others may not be reportable by the network itself, but are nevertheless perceived by a user. Key Performance Indicators (KPIs) are internal indicators based on time-referenced network counters. Such KPIs are evaluated in the context of other counters and related to KQIs. Each KPI and KQI is a time-referenced measure of the particular indictor. Variations in each KPI and KQI can be tracked to a particular time indication. Network KPIs may be measured and monitored using defined standard interfaces in the wireless network. These KPIs include multiple network performance counters and timers. For example, in a mobile data service network, the service accessibility may be determined through the Packet Data Protocol (PDP) Context Activation Success Rate KPI, which may be an aggregated ratio of the successful PDP context activations to PDP context attempts. This KPI indicates the ability of the mobile subscriber to access the packet switched service.

In, for example, a web browsing session, a customer utilizing a mobile device that communicates with a web server via a communication network 100 will have a perceived performance experience. Such a network may include a large number of physical sub-systems, and network components, making problem identification, analysis or resolution difficult tasks. In the context of the web browsing session, in one example a customer may experience an average download throughput rate of 1 Mbps during a time where a peak number of customer service sessions are being handled by the network, and a throughput rate of 2 Mbps otherwise. In a scenario where the download throughput rate for a customer service session deviates significantly from these learned trends, a root cause analysis can be identified using an analysis system. One KQI discussed herein is the HTTP Large Page Display rate as measured in kbps, which is a metric of a web browsing session. As discussed herein, an anomaly in this rate can be correlated to an anomaly in a KPI and these used to determine the root cause of this problem in the network.

Figure 12:
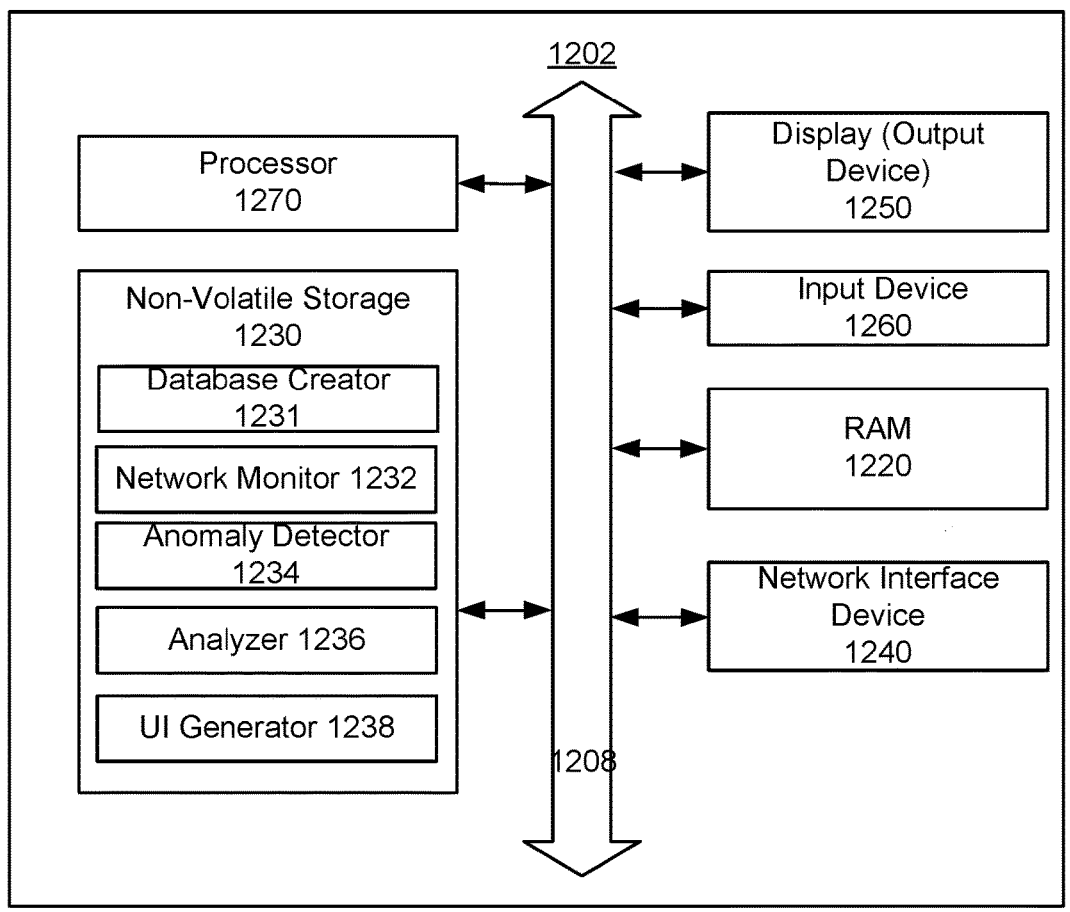
FIG. 12 is a block diagram of a processing device suitable for implementing the system and method.

Returning to FIG. 1, a network monitoring system 150 may include a database processor 152, a fingerprint database 155, a network monitor 160, and anomaly detector 165, an anomaly and root cause analyzer 170 and an output generator 180. A network monitoring system 150 may be implemented in a computer system comprising one or more computing devices of various types. One example of such a computing system is illustrated in FIG. 12. Network monitoring system 150 may be a discrete system, or it may be integrated within other systems including the systems and components within the communication network 100.

Database processor 152 performs association rule learning on historical network data 110 and engineering data 120 to create the fingerprint database 155. The historical network data 110 comprises historical network performance data as characterized by the KPIs and KQIs available for the network and is sequenced in time. The database provides a set of rules reflecting the relationship between KPIs and KQI that influence network performance. The creation of the fingerprint database is performed in an automated fashion once access to historical network data 110 and engineering data is provided.

The fingerprint database 155 is utilized by the anomaly detector 165 and analyzer 170 to determine which factors may contribute to network quality issues, and thereby identify possible root causes of network quality issues. The fingerprint database 155 may be updated periodically as new historical network data 110 or engineering data 120 is provided for the network 100.

The network monitor 160 accesses various components of network 100 to monitor analysis data for defined KPI and KQI data in real time and/or periodically. Anomalies in the data accessed by the network monitor 160 are then analyzed by analyzer 170 when the anomaly detector 165 detects an anomaly. Alternatively, anomaly detector 165 and/or analyzer 170 may periodically analyze stored data additionally to or instead of analyzing data in real time.

The anomaly detector 165 compares the historical data for KPIs to detect variations in KPI and KQI analysis data. Each KPI and KQI has a normal range of operational values which can be defined. When a data outlier in KPI or KQI analysis data occurs, an anomaly may be indicated. When a KQI or KPI anomaly is detected, the anomaly detector 165 may further perform a co-occurrence detection to search for other KPIs and KQIs to determine whether simultaneous or near-simultaneous anomalies in other KPIs and KQIs have also occurred. These detected, co-occurred anomalies are then analyzed by a matching algorithm in the analyzer 170 relative to data retrieved from the fingerprint database to determine likely root causes of the anomalies detected. To detect anomalies in analysis data, for each parameter monitored, a detection cycle is triggered during which a fragment of analysis data is received. Time stamps of the data fragment are recorded. The anomaly detector calculates the variance in any data point according to minimum threshold variations defined for each parameter. Such variations may be determined from historical data for each parameter. The system may include a set of default thresholds for each monitored parameter, with such thresholds being adjustable by an operator of the network monitoring system.

The analyzer 170 performs a matching analysis. In the matching analysis, anomalies in the KPI and KQI data analysis data which are co-occurring in time are matched to learned rules in the fingerprint database to identify potential root causes of network issues. The matching between the KPI data, KQI data and the fingerprint database may, in one embodiment, be performed by comparing the identified abnormal patterns with rules derived from records in the historic knowledge database under a given similarity measure. One example is the k-nearest neighbors (KNN) algorithm.

Figure 2A:
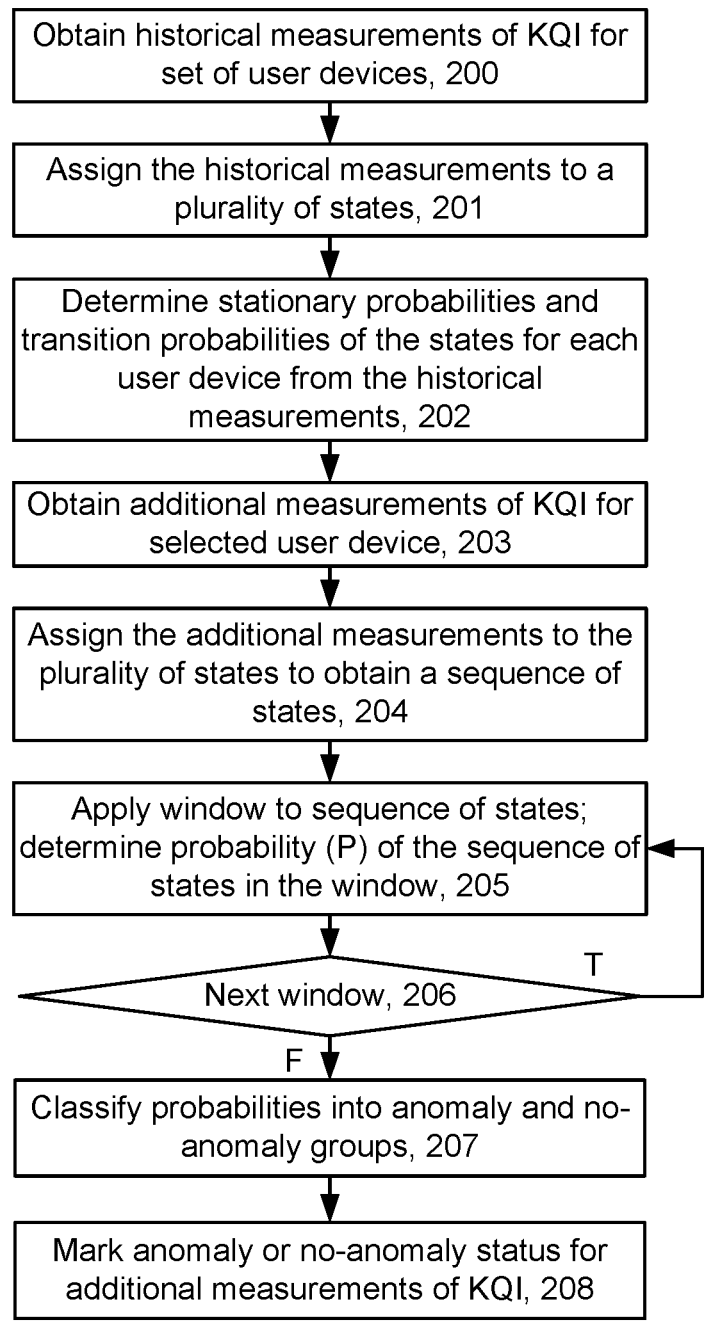
FIG. 2A is a flowchart illustrating an example embodiment of a method for identifying an anomaly in accordance with the system and method.

FIG. 2A is a flowchart illustrating an example embodiment of a method for identifying an anomaly in accordance with the system and method. Step 200 includes obtaining historical measurements of KQI for a set of user devices. For example, this can be gathered over a period of weeks or months. A goal is to obtain a sufficient amount of data to represent a wide range of performance in the network. Data can be gathered for one or more KQIs or other performance measurements, for instance. Step 201 includes assigning the historical measurements to a plurality of states. The states may indicate a level of performance ranging from bad to very good. For example, five states could be used: e.g., S1 for bad, S2 for poor, S3 for normal, S4 for good and S5 for very good. For instance, if the KQI is a web page display rate, as measured in Mbps, a higher value is better. A different range of values of Mbps can be associated with each state. In one approach, the ranges are set based on the measurements. See also FIGS. 2D and 5A-5F.

By defining the states based on an aggregation of KQI data from many users over time, the states will reflect a wide range of performance in the network. Also, the additional measurements of a selected user device are compared to peer user devices in the network which operate under the same conditions, to better decide if the specific user is experiencing an abnormal event. Although, in theory, it also is possible to define the states based on the KQI data from a single user.

Step 202 includes determining stationary probabilities and transition probabilities of the states for each user device from the historical measurements. See FIG. 6B for an example of transition probabilities and FIG. 7 for an example of stationary probabilities. A stationary probability may be the probability that a given state occurs in the historical measurements. This may be a number of times the historical measurements of the KQI are assigned to a particular state divided by a number of the historical measurements of the KQI. For instance, if there are 100 measurements and fifty are assigned to S5, the stationary probability of S5 is 50% or 0.50. A transition probability is the probability of a transition from one state to another. A stochastic process may be used for determining the transition probabilities. One possible example is a Markov chain or model.

Step 203 includes obtaining additional measurements of the KQI for a selected user device. These additional measurements could be real-time measurements of the KQI for the user device, or these additional measures could be obtained "real-time" (as it is created) data and then analyzed at a later time. For instance, it may be desired to analyze the behavior of a particular user device in detail. Note that steps 200-202 can occur well before steps 203-208. For example, the probabilities determined by steps 200-202 can be stored for use in later weeks or months when it is desired to analyze the behavior of a particular user device in detail. Although, the probabilities may be updated periodically such as once a month to reflect possible changes in network behavior. Further, steps 203-208 can be performed for one or more user devices, separately or in parallel. The additional measurements may encompass a smaller amount of time, e.g., minutes or days, compared to the amount of time encompassed by the historical data, e.g., weeks or months. That is, the additional measurements are obtained over a time period which is less than a time period over which the historical measurements are obtained. This is advantageous because a problem with a particular user device can be quickly analyzed without waiting to gather additional data from the user device over a long period of time. An example of the additional measurements is at FIG. 8.

Step 204 includes assigning the additional measurements to the plurality of states to obtain a sequence of states. See FIG. 8. These can be the same states to which the historical data was assigned in step 201. Step 205 includes applying a window to the sequence of states, and determining a probability (P) of the sequence of states in the window. For example, with a window size of three states, a first window encompasses the data of rows with indexes 1-3 in FIG. 8, a second window encompasses the data of rows with indexes 2-4, and so forth, as the window moves through the data. In other words, successive sequences of the states are selected and a probability is determined for each sequence. This probability can be associated with the last state of the sequence. For instance, in FIG. 8, the probability for the first window (rows 1-3) is listed under row 3 as Event-ProbWS3=0.503. The probability for the window which includes rows 15-17 is listed under row 17 as Event-ProbWS3=0.015.

A decision step 206 determines whether there is a next window of states to analyze. If decision step 206 is true, the process continues at step 205. If decision step 206 is false, step 207 includes classifying the probabilities into anomaly and no-anomaly groups. For example, a clustering technique such as Partitioning Around Medoids (PAM) may be used to define a cluster of probabilities which are consistent with an anomaly and a cluster of probabilities which are consistent with no anomaly. Clustering attempts to group similar relatively low values of probabilities into the anomaly group and similar relatively high values of probabilities into the no-anomaly group. In another approach, the probabilities can be classified into anomaly or no-anomaly groups based on whether they are below or above a threshold. However, the use of clustering is advantageous because it adapts to the range of probabilities of a set of data for a given user. The range or distribution of probabilities could vary based on the time period over which the additional measurements are obtained. Step 208 marks an anomaly or no-anomaly status for the additional measurements of KQI. For example, a 1 or 0 value can be stored in a table such as in FIG. 8. The process is then completed. Additional steps can be taken to diagnose the anomaly.

The historical and additional measurements can be collected by the network monitoring system 150, for instance.

Figure 2B:
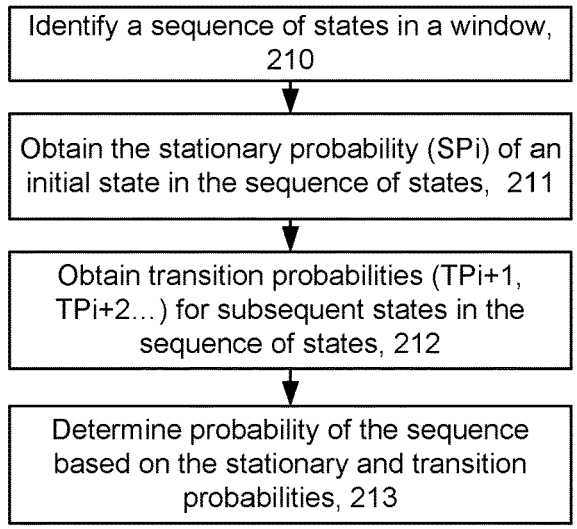
FIG. 2B depicts an example process for determining a probability of a sequence using stationary and transition probabilities, consistent with step 205 of FIG. 2A.

FIG. 2B depicts an example process for determining a probability of a sequence using stationary and transition probabilities, consistent with step 205 of FIG. 2A. Step 210 includes identifying a sequence of states in a window. Step 211 includes obtaining the stationary probability (SPi) of an initial state in the sequence of states. The index i denotes a position of a state in the sequence. This may be computed at the time the historical data is processed and the transition probabilities are obtained. Step 212 includes obtaining transition probabilities (TPi+1, TPi+2 . . . ) for transitions to subsequent states in the sequence of states. Step 213 includes determining the probability of the sequence based on the stationary and transition probabilities. For example, assume a window size of three states. The probability of a sequence of three states can be calculated as geometric mean of SPi, TPi+1, and TPi+2. See FIG. 10. See also FIG. 8 at rows 18-20 for a specific example. For instance, rows 18, 19 and 20 have a sequence of states S4, S2 and S3, respectively. SPi is the stationary probability of S4 (SP4 in FIG. 7). TPi+1 is the transition probability of S4 to S2 (TP42 in FIG. 6B). TPi+2 is the transition probability of S2 to S3 (TP23 in FIG. 6B). Thus, the probability of the sequence is the geometric mean of SP1, TP42 and TP23, in one approach. This is the cube root of SP1×TP42×TP23. Other techniques for determining probability could also be used.

Figure 2C:
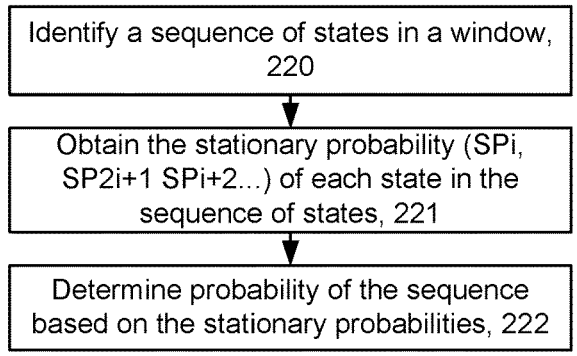
FIG. 2C depicts an example process for determining a probability of a sequence using stationary probabilities, consistent with step 205 of FIG. 2A.

FIG. 2C depicts an example process for determining a probability of a sequence using stationary probabilities, consistent with step 205 of FIG. 2A. Step 220 includes identifying a sequence of states in a window. Step 221 includes obtaining the stationary probability (SP1, SP2, SP3 . . . ) of each state in the sequence of states. Step 222 includes determining the probability of the sequence based on the stationary probabilities. As with the example of FIG. 2B, the probability of the sequence of three states can be calculated as geometric mean of SP1, SP2 and SP3. See FIG. 10. In the example of FIG. 8 at rows 18-20, rows 18, 19 and 20 have states S4, S2 and S3, respectively, with stationary probabilities of SP4, SP2 and SP3, respectively. Thus, the probability of the sequence is the geometric mean of SP4, SP2 and SP3, in one approach. This is the cube root of SP4×SP2×SP3.

If we use the transition probability learned from the historical data of the user when one or more of the states occur rarely or not at all, it may bias the resulting sequence probability. In this case, we use the stationary probability instead. In one approach, we count the number of times each state is present in the selected user's historical measurements. If any of the states is present less than a threshold number of times in the historical measurements, a record may be kept which indicates that stationary probabilities should be used to determine whether an anomaly exists in additional measurements of the user device. Similarly, if none of the states is present less than a threshold number of times in the historical measurements from a selected user device, a record may be kept which indicates that transition and stationary probabilities should be used to determine whether an anomaly exists in additional measurements of the user device.

Figure 2D:
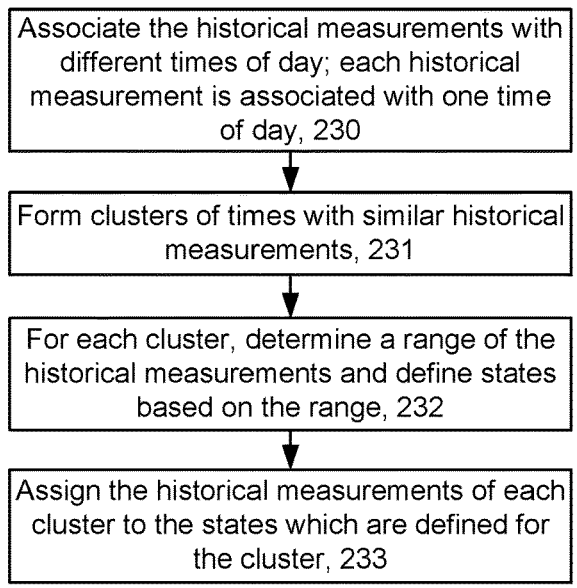
FIG. 2D depicts an example process for using clustering to assign historical measurements to states, consistent with step 201 of FIG. 2A.

FIG. 2D depicts an example process for using clustering to assign historical measurements to states, consistent with step 201 of FIG. 2A. Step 230 includes associating the historical measurements with different times of day, with each historical measurement being associated with one time of day. There may be a many to one mapping of historical measurements to each time of day. For example, the times of day can be at one hour increments, in one possible approach. As an example, in FIG. 5A, each dot represents a historical measurement and these measurements are associated with different hours of a day in a repeating 24 hour cycle. It is also possible to providing separate mappings for different days of the week, weekdays versus weekends and so forth.

Figure 5A:
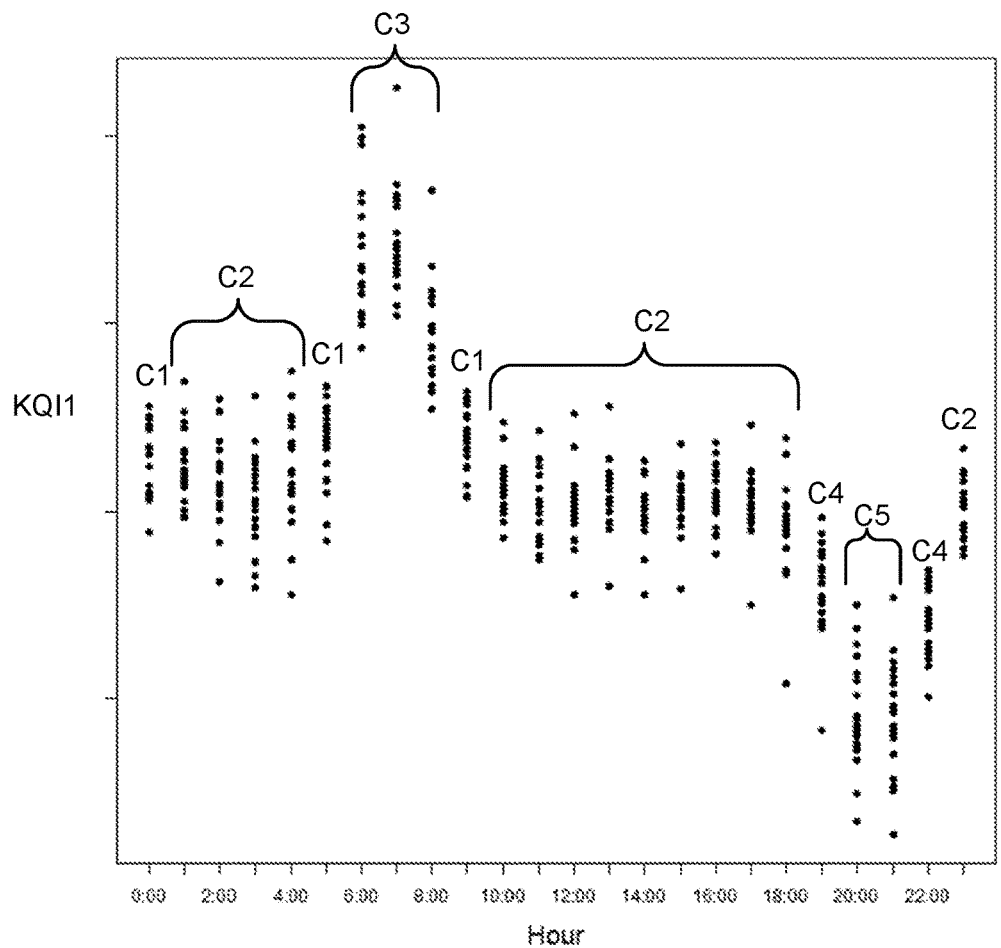
FIG. 5A depicts clustering of the hourly KQI data.

Step 231 includes forming clusters of times with similar historical measurements. For example, clusters C1-C5 are depicted in FIG. 5A.

Figure 5B:
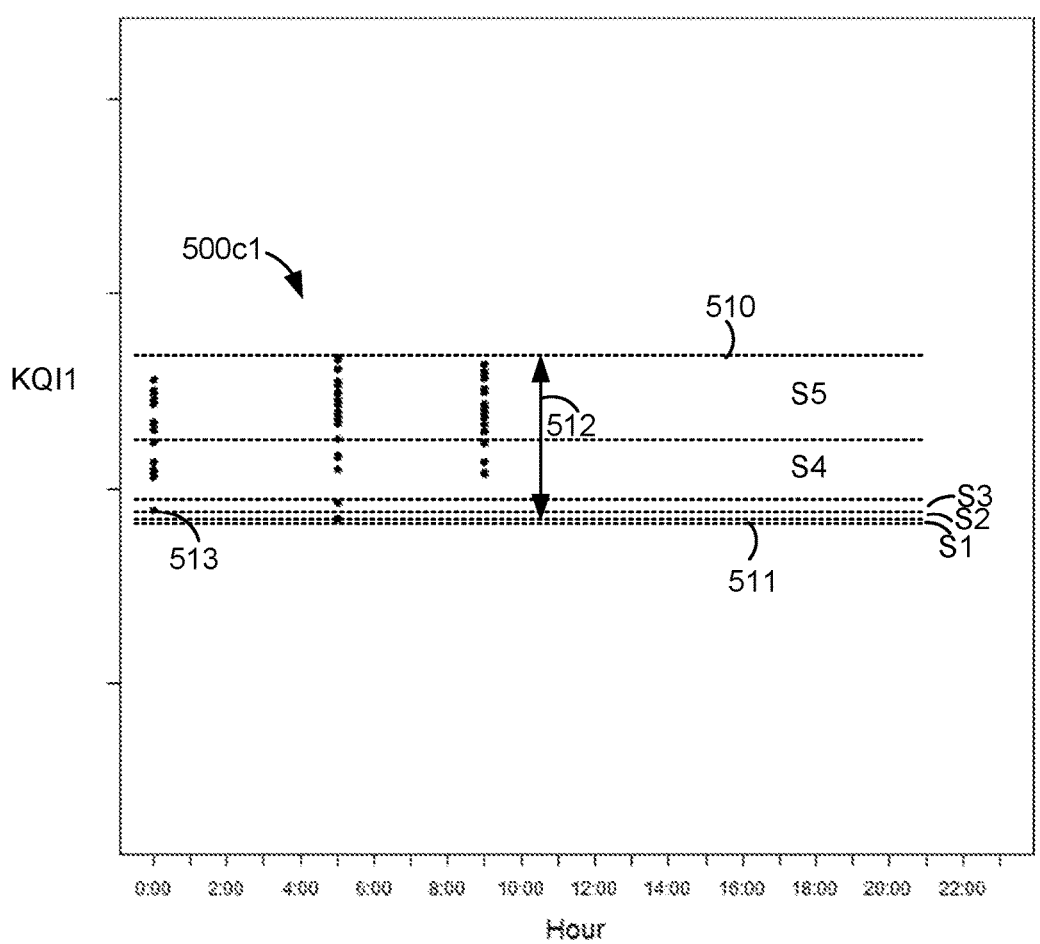
FIG. 5B depicts a set of KQI values 500c1 and corresponding states S1-S5 for the cluster C1 in FIG. 5A.
Figure 5C:
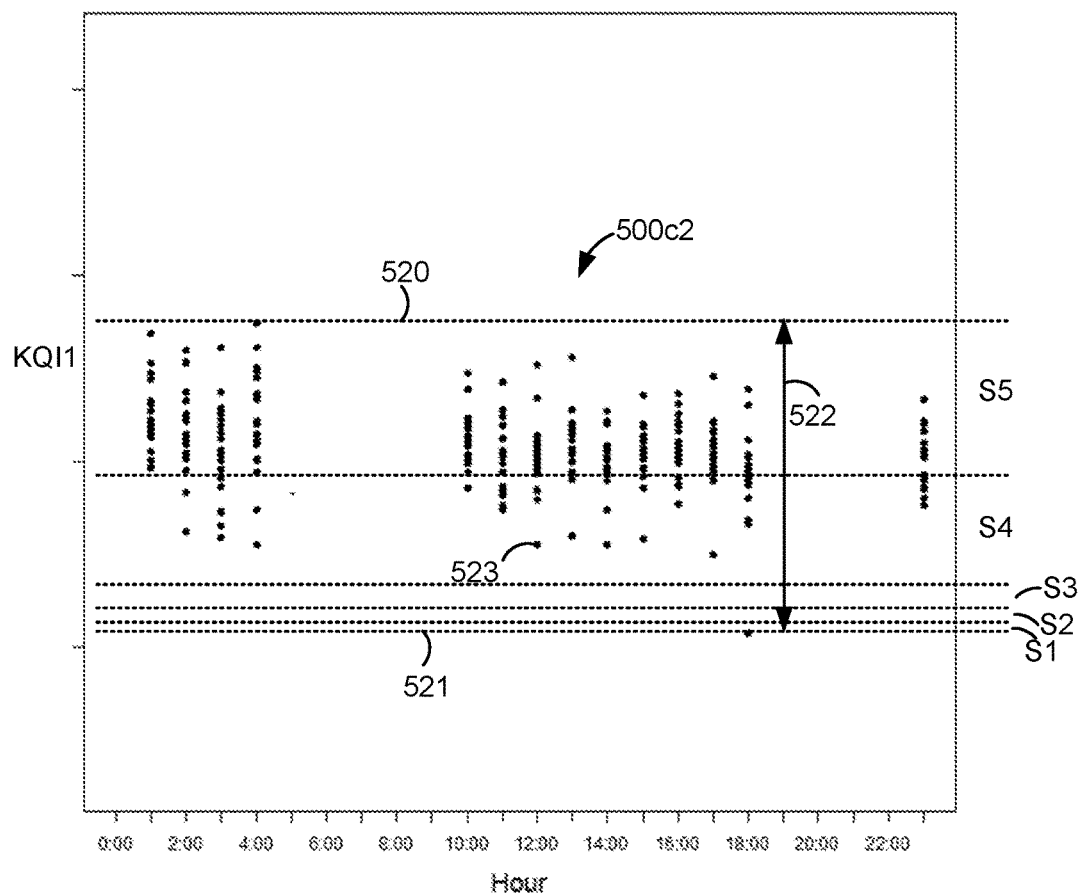
FIG. 5C depicts a set of KQI values 500c2 and corresponding states S1-S5 for the cluster C2 in FIG. 5A.
Figure 5D:
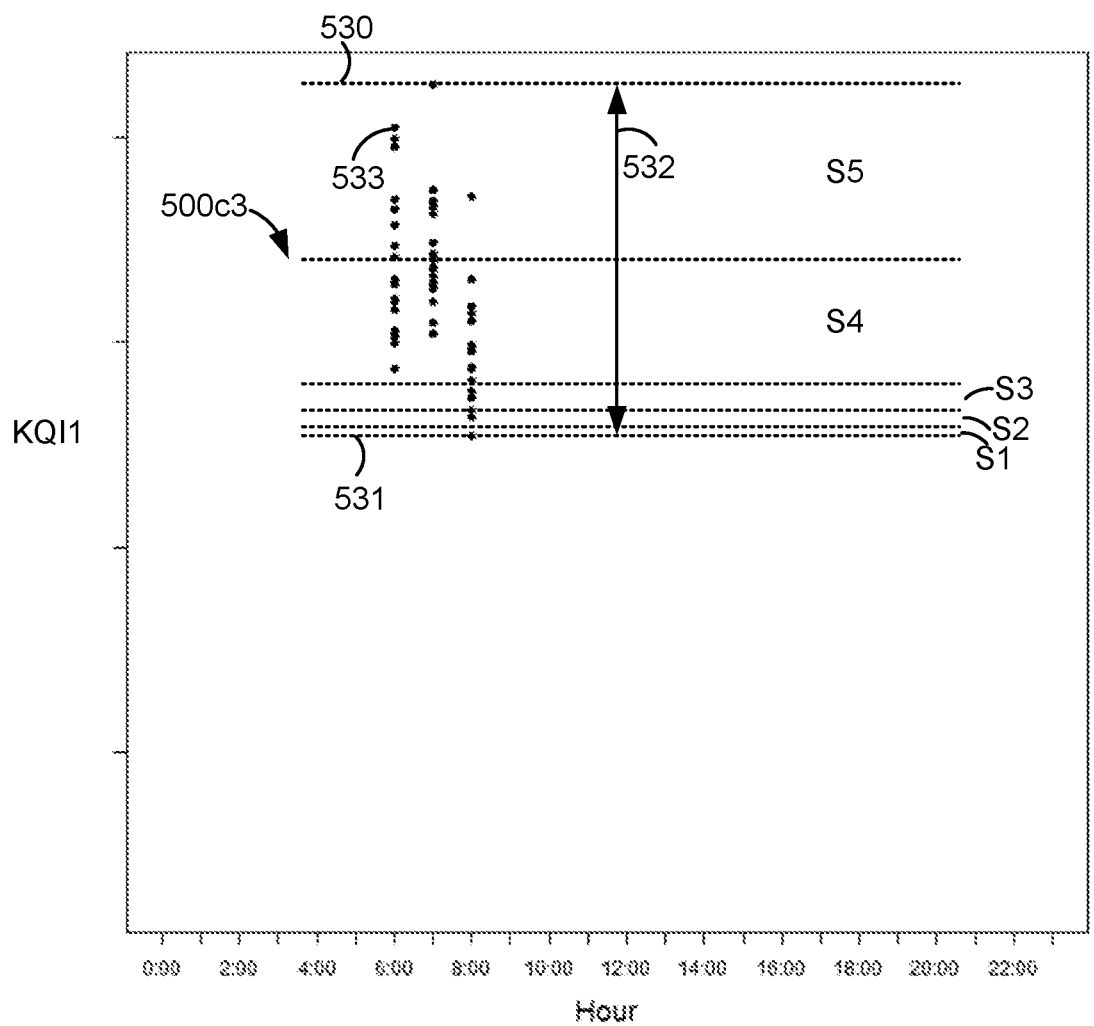
FIG. 5D depicts a set of KQI values 500c3 and corresponding states S1-S5 for the cluster C3 in FIG. 5A.
Figure 5E:
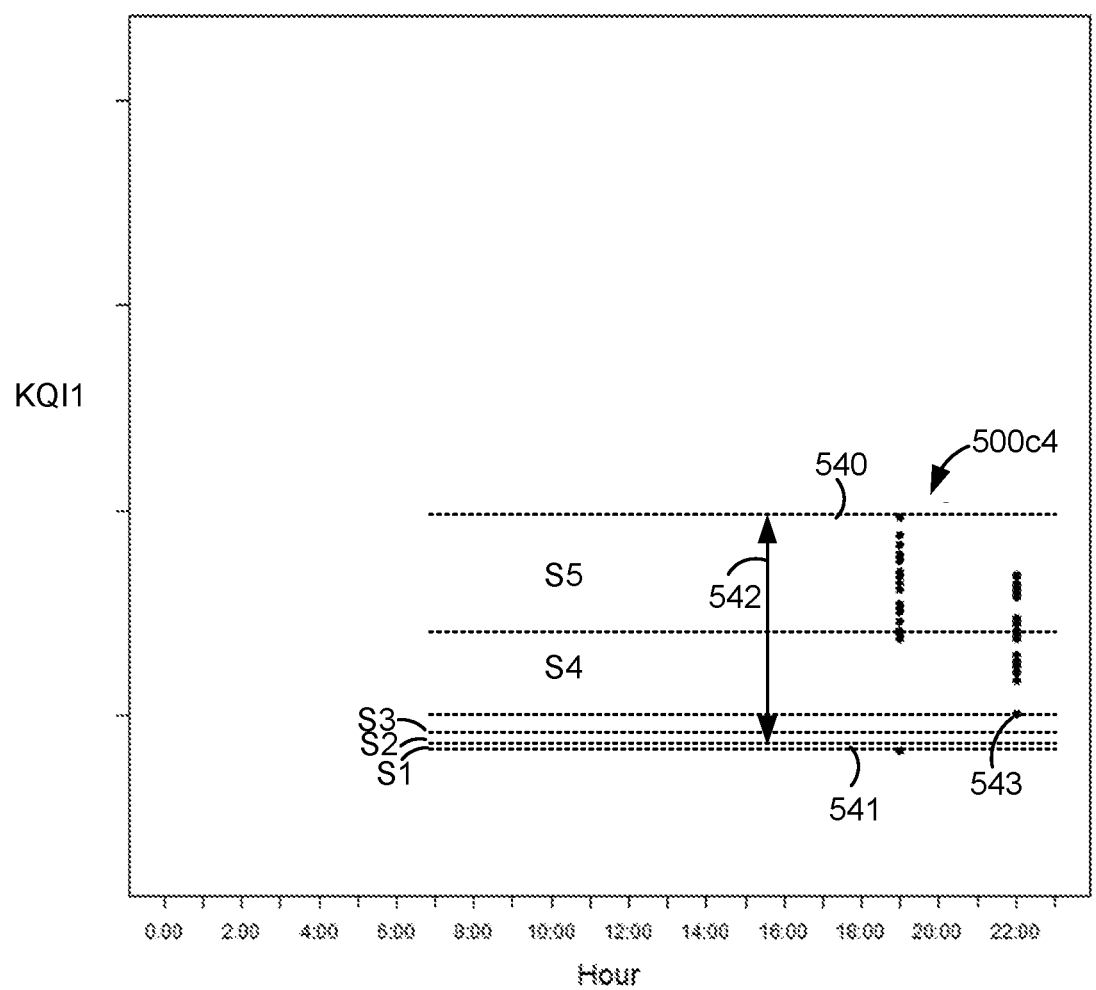
FIG. 5E depicts a set of KQI values 500c4 and corresponding states S1-S5 for the cluster C4 in FIG. 5A.
Figure 5F:
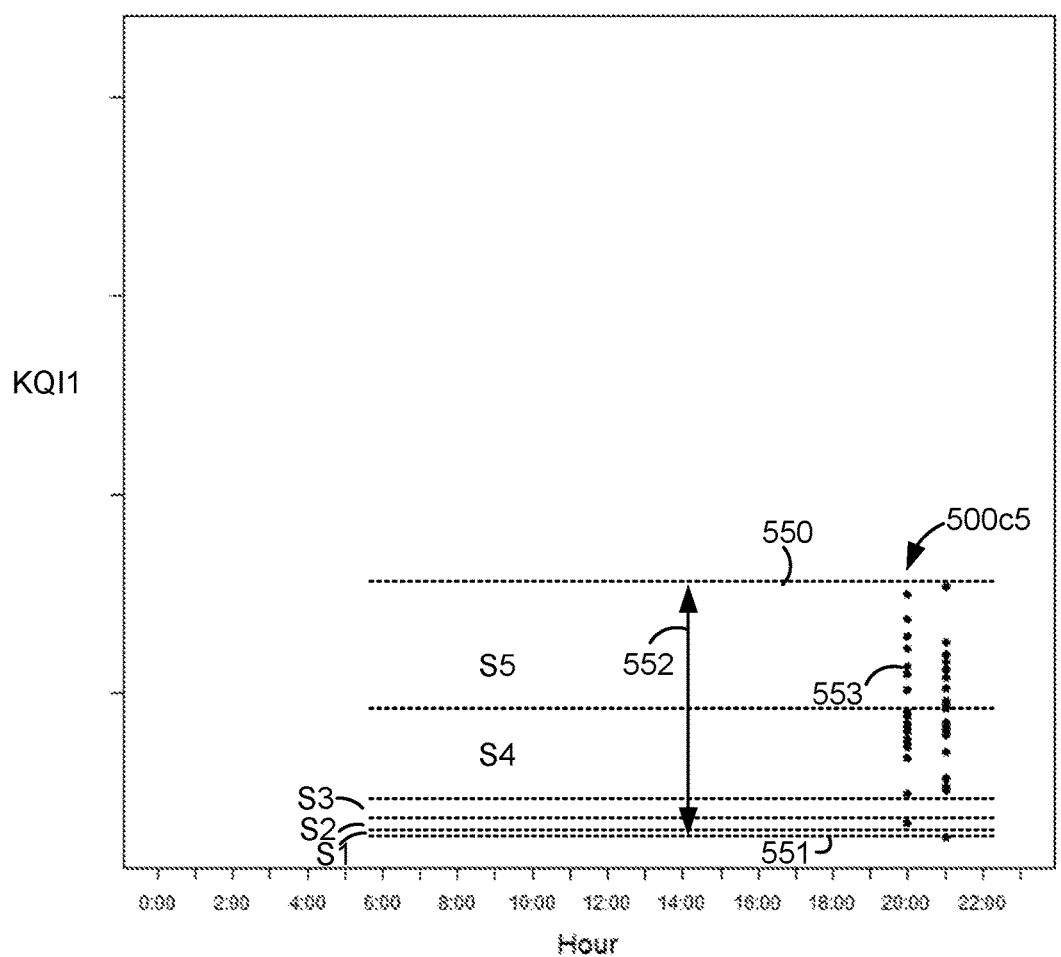
FIG. 5F depicts a set of KQI values 500c5 and corresponding states S1-S5 for the cluster C5 in FIG. 5A.

Step 232 includes, for each cluster, determining a range of the historical measurements and defining the states based on the range. For example, FIG. 5B depicts a range 512 of values for C1 which extend between a highest value 510 and a lowest value 511. FIG. 5C depicts a range 522 of values for C2 which extend between a highest value 520 and a lowest value 521. FIG. 5D depicts a range 532 of values for C3 which extend between a highest value 530 and a lowest value 531. FIG. 5E depicts a range 542 of values for C4 which extend between a highest value 540 and a lowest value 541. FIG. 5F depicts a range 552 of values for C5 which extend between a highest value 550 and a lowest value 551.

The states are defined by dividing the range into different increments. In the examples of FIG. 5B-5F, unequal increments are used and the increments become progressively larger moving from the bottom of the range to the top of the range. For example, S1 may be defined by the bottom 0-2% of the range, S2 may be defined by the next 2-5% of the range, S3 may be defined by the next 5-20% of the range, S4 may be defined by the next 20-50% of the range, and S5 may be defined by the next 50-100% of the range. Other approaches are possible, including the use of equal increments.

Step 233 includes assigning the historical measurements of each cluster to the states which are defined adaptively for the cluster. See FIG. 5A-5F for further details. For example, in FIG. 5B, a historical measurement 513 in a set of KQI values 500c1 is assigned to S3. In FIG. 5C, a historical measurement 523 in a set of KQI values 500c2 is assigned to S4. In FIG. 5D, a historical measurement 533 in a set of KQI values 500c3 is assigned to S5. In FIG. 5E, a historical measurement 543 in a set of KQI values 500c4 is assigned to S4. In FIG. 5F, a historical measurement 553 in a set of KQI values 500c5 is assigned to S5.

By defining the states based on the time of day and the corresponding amount of network activity, the performance measurements can be better classified based on their relative levels for a given time of day or other time point. For example, the same web page display rate can represent a relatively good performance during a time of day with high traffic (e.g., and be classified to S4) or a relatively bad performance during a time of day with low traffic (e.g., and be classified to S2). A change in the performance of a selected user device relative to a population of user devices in a network can therefore be detected.

Figure 3:
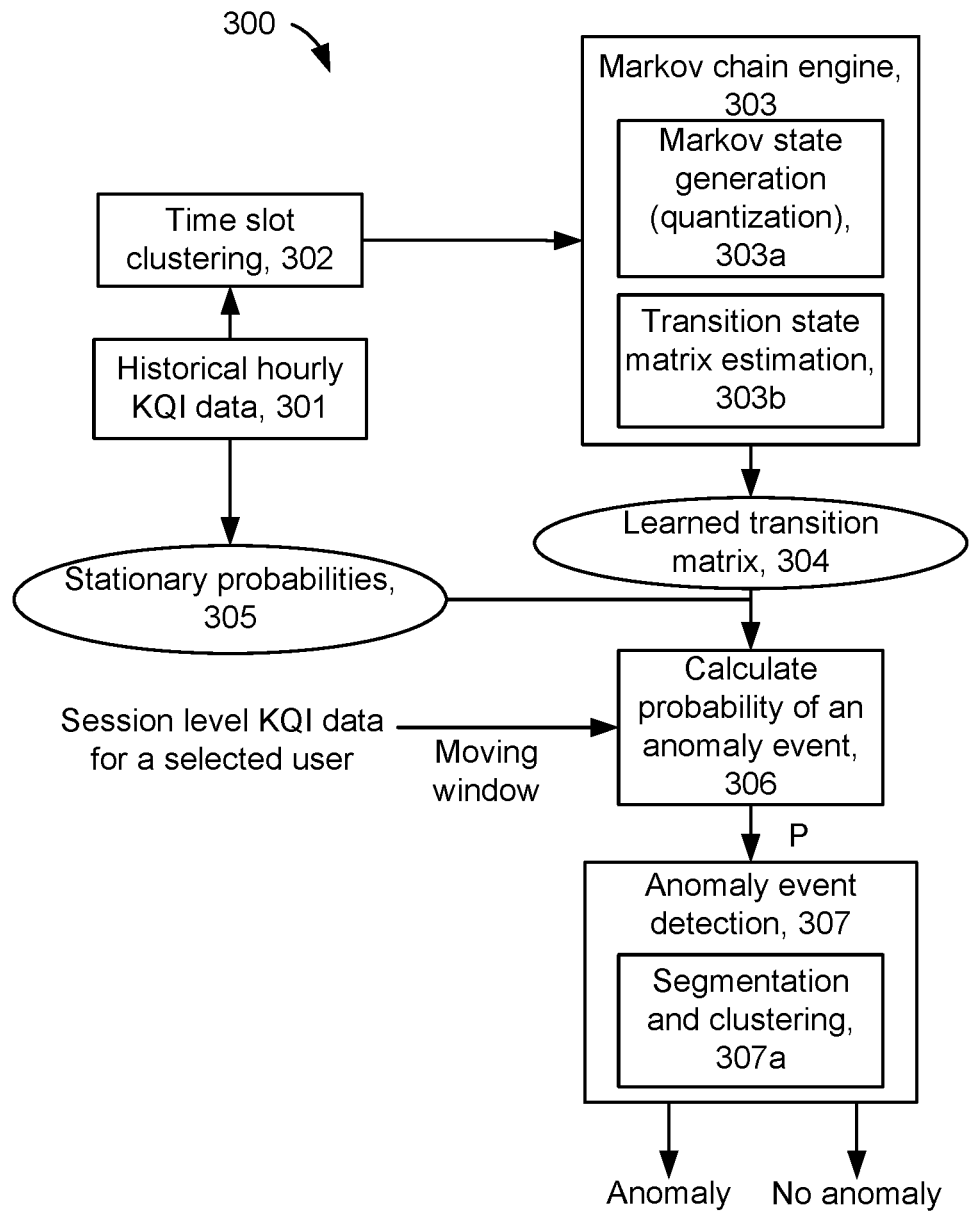
FIG. 3 depicts functional and structural components in an example embodiment of a system for implementing the process of FIG. 2A.

FIG. 3 depicts functional and structural components in an example embodiment of a system for implementing the process of FIG. 2A. The components depicted can be implemented in hardware and/or software. The system 300 depicts historical hourly KQI data 301 for each user device, for instance. The KQI data for each user can be aggregated over an hourly basis, for instance, or other time period, to reduce the amount of data which is stored. For example, if there are three measurements of display rate for a user in an hour, at 12:10 pm, 12:30 pm and 12:35 pm, the data may be stored indexed to 1 pm, representing activity in the time period of 12-1 pm. See FIG. 4 for an example. The KQI data for the user devices is provided to a time slot clustering component 302 which sorts the KQI data for different users and days by time of day. For example, the KQI data for each user device at 1 pm each day for a month is associated with the time of 1 pm. Thus, there are multiple data points at 1 pm. See also FIG. 5A.

The sorted KQI data is provided to a Markov chain engine 303, in one possible approach. The engine includes a Markov state generation process 303a, which performs quantization to assign the KQI measurements to states, one state per measurement. See step 201 in FIG. 2, discussed previously, and FIG. 5A. The engine also provides a transition state matrix estimation 303b. See step 202 in FIG. 2, discussed previously. A learned transition matrix 304 is output from the engine to a component 306. The component 306 uses the transition matrix along with stationary probabilities 305, which can be calculated from the historical hourly KQI data, to calculate the probability of an anomaly event. The probability is determined for each of a plurality of sequences of states from session level KQI data for a selected user. The session level KQI data is data which can vary quickly, e.g., over seconds or minutes. A session refers to a time period in which the user device is being used, e.g., by the user or, in some cases, by the network without the user present. The user can perform actions such as using applications, viewing web pages or placing a phone call in a session. Once the user device is inactive for a specified period such as 30 minutes and becomes active again, a new session is considered to begin.

A moving window is applied to a sequence of states representing the additional measurements of the session level KQI data for the selected user, and a probability is determined for the sequence of states in each window. The windows may be overlapping, and each window comprises a sequence of multiple states. An optimum window size can be determined from experimentation or engineering judgement. With a window size of three entries, a first window may include entries in rows 1-3, a second window may include entries in rows 2-4, and so forth. See FIG. 8.

For each window, the detection of whether the anomaly exists is based on the probability of the sequence of states, in one approach. The component 306 outputs the probability P for each window to an anomaly event detection component 307. The component can evaluate the probability P to determine if an anomaly has occurred. In one approach, an anomaly is indicated if the probability is less than a threshold. The determination of whether an anomaly has occurred may be done real-time as the session level data is received.

In another approach, after calculating several probabilities for respective sequences, a segmentation and clustering component 307a can be used to define two clusters. One cluster, with relatively high probabilities, represents a normal event, or no-anomaly. Another cluster, with relatively low probabilities, represents an anomaly event. A clustering technique such as Partitioning Around Medoid (PAM) can be used. The clustering process should be applied to a sufficient number of additional measurements of a user device to reflect the user's experience and more effectively explain a detected anomaly. The proposed approach automatically clusters all probabilities into two groups: anomaly and no-anomaly. Each group has its own cluster center, and the cluster with a lower center is identified as an anomaly.

The clustering algorithm can be divided into two phases. A first phase includes initializing a collection of objects (e.g., probabilities) to provide for an initial set. A second phase includes exchanging the selected objects with unselected objects to improve the quality of clustering through minimizing the dissimilarity of all unselected probabilities to their closest selected probabilities. The process thus minimizes the distance of the probability of an event from the center of the cluster.

Based on the cluster into which the probability is assigned, the component provides an output flag of anomaly or no-anomaly for each window, and the session level data can be marked accordingly. See FIG. 8, where indexes 18-20 are marked as 1 to denote an anomaly and the remaining indexes are marked as 0 to denote no anomaly using the flag EventLabel.

Figure 4:
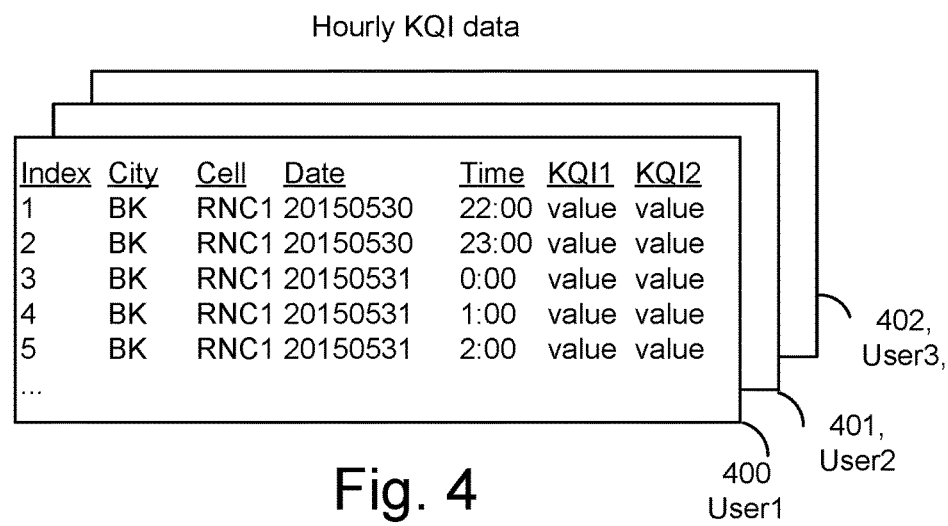
FIG. 4 is a table depicting example KQI data for different users aggregated on an hourly basis.

FIG. 4 is a table depicting example KQI data for different users aggregated on an hourly basis. The index represents the row number in the table. The data can include information such as the city (e.g., BK or Bangkok), a cell identifier (e.g., RNC1), the date in the format year:month:day and the time in hourly increments. Values for one or more KQIs (e.g., KQI1 and KQI2), can also be provided. A separate table of data can be provided for each user, in one approach. For example, tables 400, 401 and 402 can be provided for user1, user2, and user3, respectively. The table depicts a few example entries over two days. In practice, the historical data may encompass a longer period.

FIG. 5A depicts clustering of the hourly KQI data. The KQI1 data is aggregated on an hourly basis, or other periodic basis, as shown in FIG. 4, and plotted versus time for the multiple days of the historical time period. The plot may be for multiple users, for instance, so that the definitions of the states reflect the performance of different user devices in the network. For example, the historical data may be obtained over the month of July. There will typically be a data point for KQI1 for several days of the month for each hourly time unit. That is, the time 0:00 represents midnight for each day in July and the several data points may be obtained at midnight on several different days in July from different user devices.

Further, the KQI data points for each hour are classified into a cluster, where five clusters are used as denoted by C1-C5, as an example. This can be done by clustering time intervals with similar KQI levels into the same cluster. The PAM clustering technique, discussed previously, may be used. The clusters C1-C5 represent relatively low values through relatively high values of KQI. The KQI1 data points at 0:00, 5:00 and 9:00 are classified into C1. The KQI1 data points at 1:00-4:00, 10:00-18:00 and 23:00 are classified into C2. The KQI1 data points at 6:00-8:00 are classified into C3. The KQI1 data points at 22:00 are classified into C4. The KQI1 data points which are relatively low at 20:00 (8 pm) and 21:00 (9 pm) are classified into C5. This is a time of high usage for cell phones so that performance measures will be relatively low.

Regarding the data points which occur in early morning hours, some users may be awake and actively using their devices while other users are sleeping but their device may still have some activity. For example, some applications on a device may run in the background and download and cache video advertisements. Other activity such as receiving software updates can also occur.

A time slot clustering algorithm clusters the time intervals with similar KQI behavior into the same cluster. Then, the proposed technique defines five states for each cluster. This allows detection of a deterioration in the performance of a user device. That is, e.g., even though the KQI of the historical sessions is higher in C3 than in C5, a worsening of performance within C3 can be detected. Similarly, a worsening of performance within C5 can be detected.

FIG. 5B depicts a set of KQI values 500c1 and corresponding states S1-S5 for the cluster C1 in FIG. 5A. As mentioned, the KQI values extend in a range 512 between a highest value 510 and a lowest value 511, and a historical measurement 513 is assigned to S3.

FIG. 5C depicts a set of KQI values 500c2 and corresponding states S1-S5 for the cluster C2 in FIG. 5A. As mentioned, the KQI values extend in a range 522 between a highest value 520 and a lowest value 521, and a historical measurement 523 is assigned to S4.

FIG. 5D depicts a set of KQI values 500c3 and corresponding states S1-S5 for the cluster C3 in FIG. 5A. As mentioned, the KQI values extend in a range 532 between a highest value 530 and a lowest value 531, and a historical measurement 533 is assigned to S5.

FIG. 5E depicts a set of KQI values 500c4 and corresponding states S1-S5 for the cluster C4 in FIG. 5A. As mentioned, the KQI values extend in a range 542 between a highest value 540 and a lowest value 541, and a historical measurement 543 is assigned to S4.

FIG. 5F depicts a set of KQI values 500c5 and corresponding states S1-S5 for the cluster C5 in FIG. 5A. As mentioned, the KQI values extend in a range 552 between a highest value 550 and a lowest value 551, and a historical measurement 553 is assigned to S5.

FIG. 6A depicts an example Markov chain having five states, consistent with FIG. 5A-5F. The states are S1-S5, e.g., S1 for bad, S2 for poor, S3 for normal, S4 for good and S5 for very good. A Markov chain is a stochastic model describing a sequence of possible events in which the probability of each event depends only on the state attained in the previous event. A transition probability is associated with each possible transition between states. The transitions are represented by the arrows. The transition probabilities can be represents by a transition matrix such as in FIG. 6B. FIG. 6A provides an example Markov chain which corresponds to each of the tables of transition probabilities in FIG. 6B and is for the purpose of visualization.

FIG. 6B depicts tables of transition probabilities consistent with FIG. 6A. Each row represents a current states and each column represents a potential next state. For example, the transition probability from S1 to S1, S2, S3, S4 or S5 is TP11, TP12, TP13, TP14 and TP15, respectively. The transition probability from S2 to S1, S2, S3, S4 or S5 is TP21, TP22, TP23, TP24 and TP25, respectively. The transition probability from S3 to S1, S2, S3, S4 or S5 is TP31, TP32, TP33, TP34 and TP35, respectively. The transition probability from S4 to S1, S2, S3, S4 or S5 is TP41, TP42, TP43, TP44 and TP45, respectively. The transition probability from S5 to S1, S2, S3, S4 or S5 is TP51, TP52, TP53, TP54 and TP55, respectively. The transition probabilities in a row sum to 1.

A table or matrix of transition probabilities can be provided for each user, in one approach so that the transition matrix is unique for each user. For example, tables 600, 601 and 602 are provided for user1, user2 and user3, respectively. After quantization, the actual KQI values of sessions will be represented as states in the transition matrix which characterize the quality of KQI (e.g. bad, poor, normal, good and very good). After quantization, regardless of the time of day of the sessions and the clusters the sessions are in, we look at the states of the KQI describing the user experience in the wireless network, so all data associated with the user will be analyzed together, in one possible approach. The clustering method gathers together the sessions showing the similar patterns.

FIG. 6C depicts a formula used to obtain the transition probabilities of FIG. 6B. Pij is the probability of a transition from state i to state j, where a user device is at state i at time t, and at state j at the next time, t+1. Pij is shown by the TP values in FIG. 6B. Xij is a transition between states, e.g., X12 represents the transition from S1 to S2. k represents the number of states (e.g., five) and t represents the different data points over time (e.g., the time period in which the historical data is obtained).

In some cases, a given state may be an outlier that rarely occurs. In this case, as mentioned, one approach is to calculate a probability of a sequence of states using stationary probabilities only, instead of both stationary and transition probabilities, when the frequency of a given state in the historical measurements is less than a threshold.

Figure 7:
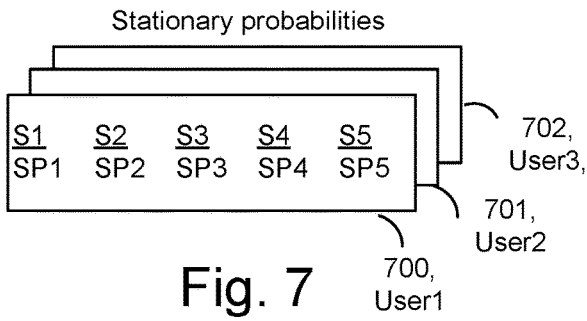
FIG. 7 depicts tables of stationary probabilities consistent with FIG. 5A.

FIG. 7 depicts tables of stationary probabilities consistent with FIG. 5A. A table or matrix of stationary probabilities can be provided for each user, in one approach. For example, tables 600, 601 and 602 are provided for user1, user2 and user3, respectively. The stationary probabilities for states S1, S2, S3 and S4 are SP1, SP2, SP3 and SP4, respectively. The stationary probabilities sum to 1. As mentioned, the stationary probability may be the probability that a given state occurs in the historical measurements. This may be a number of times the historical measurements of the KQI are assigned to a particular state divided by a number of the historical measurements of the KQI.

FIG. 8 is a table 800 depicting example raw, non-aggregated KQI data for a selected user, where the data is analyzed using a window size=3. This can be recent data of a user over several minutes, for example, and obtained from the additional measurements of FIG. 2A. The index denotes a row of data. Rows 1-23 are depicted but additional data can be provided as well. The data entries include the hour (H) and minute (Min.) (in the form H:Min.) and the seconds. KQI1 is also depicted. EventProbWS3 is the probability of an anomaly event using a window size of three data points. log(EventProbWS3) is the logarithm of EventProbWS3 and provides another way of understanding EventProbWS3. EventLabel is a 0 or 1 for no-anomaly or anomaly, respectively. EventLabel can be set for each row of data and is based on the data of the row and the two preceding rows, for instance. For example, referring to rows 1-3, EventProbWS3 cannot be determined for rows 1 and 2 because there is not a full 3-state sequence to analyze. EventProbWS3 (e.g., 0.503) can be determined for row 3 based on the states of rows 1-3.

The state remains at S5 in rows 1-15 and EventProbWS3 remains at 0.503 with EventLabel=0. The state changes to S3 in row 16 but EventProbWS3 remains at 0.503 (this assumes the probability of a transition from S5 to S5 is the same as the probability of a transition from S5 to S3) with EventLabel=0. The state changes to S2 in row 17 such that EventProbWS3 decreases to 0.015. However, this is not sufficiently low to be classified as an anomaly so that EventLabel=0. The state changes to S4 in row 18 such that EventProbWS3 decreases to 0.00456. This is sufficiently low to be classified as an anomaly so that EventLabel=1. Rows 16-18 are in an example window 801.

The state changes to S2 in row 19 such that EventProbWS3 decreases to 0.00064. This is also sufficiently low to be classified as an anomaly so that EventLabel=1. The state changes to S3 in row 20 such that EventProbWS3 increases to 0.00618. This is also sufficiently low to be classified as an anomaly so that EventLabel=1. The state changes to S4 in row 21 such that EventProbWS3 increases to 0.03067. This is no longer low enough to be classified as an anomaly so that EventLabel=0. The state changes to S3 in row 22 such that EventProbWS3 increases to 0.1472. This is also not low enough to be classified as an anomaly so that EventLabel=0. The state changes to S5 in row 23 such that EventProbWS3 increases to 0.294. This is also not low enough to be classified as an anomaly so that EventLabel=0.

The data of FIG. 8 can be analyzed to diagnose problems of a selected user device and of the network. For instance, a series of consecutive anomalous entries can show how the KQI becomes progressively worse and to perhaps suggest a solution to avoid this degradation in performance.

Figure 9A:
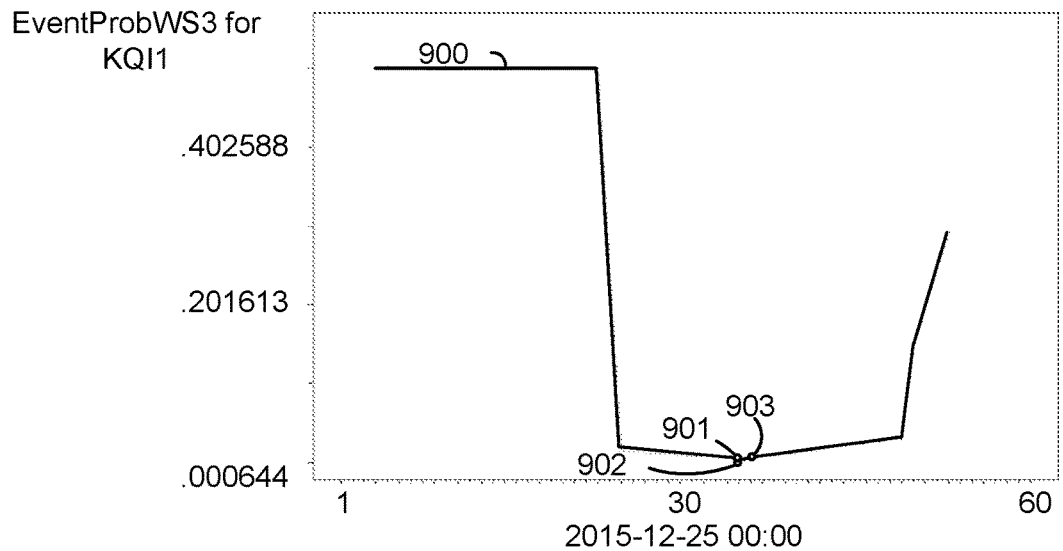
FIG. 9A is a plot depicting EventProbWS3 for KQI1 versus time, consistent with FIG. 8, showing detected anomalies.

FIG. 9A is a plot depicting EventProbWS3 for KQI1 versus time, consistent with FIG. 8, showing detected anomalies. The horizontal axis depicts a time period of 60 minutes starting at midnight on Dec. 25, 2015. A plot 900 is fitted to the various data points. The data points 901, 902 and 903 correspond to rows 18, 19 and 20, respectively. These are the points labelled as anomalies and represent the lowest values of EventProbWS3. The data is for the same user device as in FIG. 8.

Figure 9B:
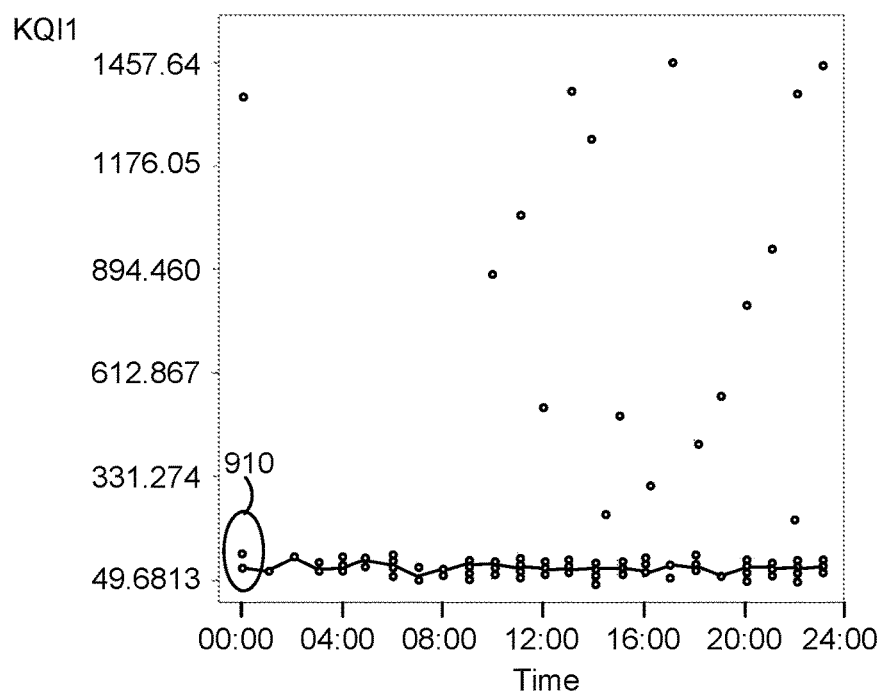
FIG. 9B is a plot depicting the hourly KQI1 versus time, consistent with FIG. 4.

FIG. 9B is a plot depicting the hourly KQI1 versus time, consistent with FIGS. 4 and 8. Each point represents an outlier. The data points are concentrated near the bottom of the plot but there are several data points in the middle and top of the plot as well. However, this hourly data is not sufficiently granular to detect the anomaly in the session level user data as in FIG. 9A. In particular, the anomalies of FIG. 9A at 00:00 (region 910) are not detected. For instance, note that the bottom hash mark on the vertical axis represents KQI1=49. The data points at 00:00 are all above this level so that the value of KQI1=35 at row 19 is not depicted due to the hourly aggregation. The data is for the same user device as in FIG. 8.

Figure 9C:
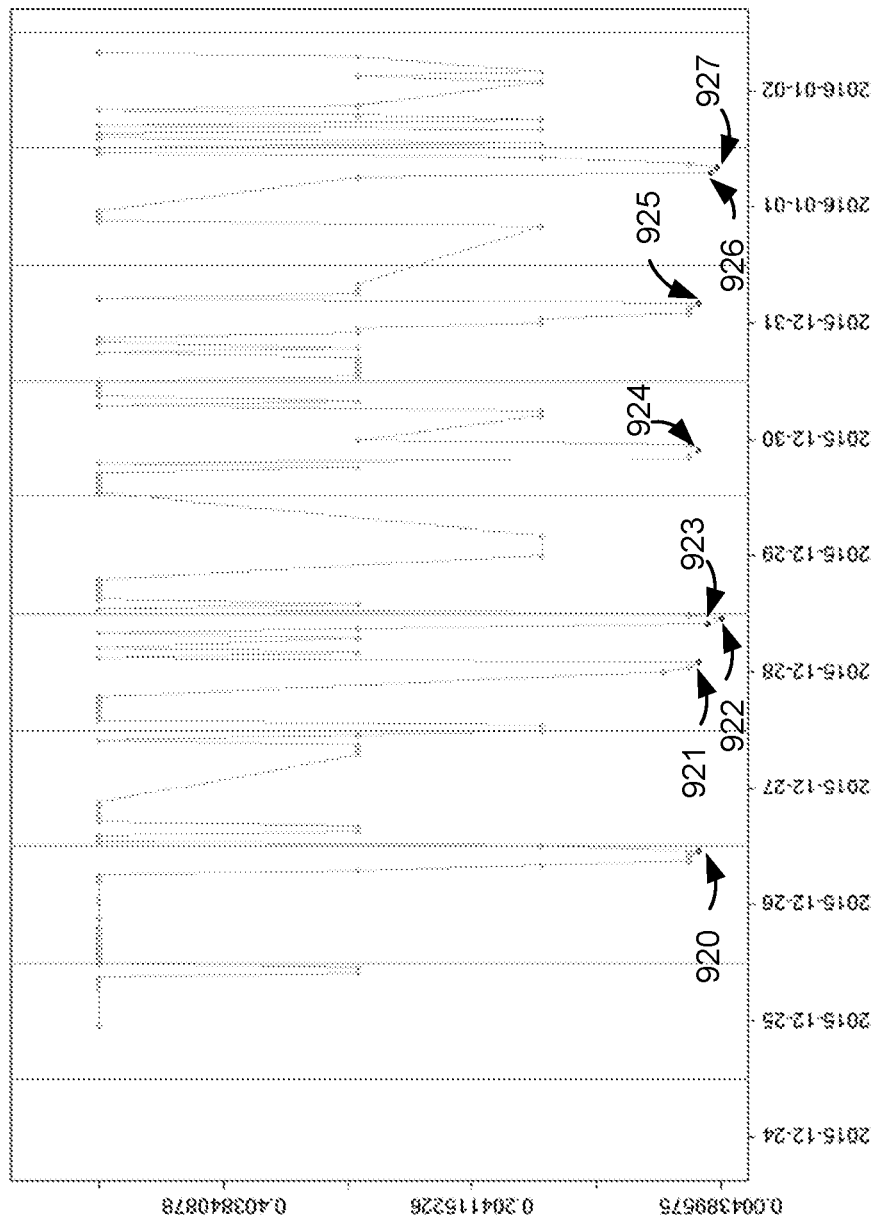
FIG. 9C is a plot depicting EventProbWS3 for KQI1 versus time over a multi-day period, showing detected anomalies.

FIG. 9C is a plot depicting EventProbWS3 for KQI1 versus time over a multi-day period, showing detected anomalies. The data is for a different user device than in FIGS. 8, 9A and -9B. The data points 920-927 are identified as anomalies. This shows an example where an anomaly occurs about once per day.

FIG. 10 depicts a formula to determine the probability of an anomaly event (P(e)). This formula provides a geometric mean of a number N probabilities. The geometric mean normalizes the joint probability in a given window size. For example, with a window size of 3, N=3. P1 is the probability of the first state in the sequence of states in the window. P2 is the probability of a sequence comprising the first state followed by the second state. P3 is the probability of a sequence comprising the first state followed by the second state, followed by the third state. The formula uses a cube root when N=3.

FIG. 11 is a table 1100 depicting example non-aggregated KQI data for a selected user, where the data is analyzed using a sequence of two entries. The table includes types of data similar to FIG. 8 but for a different user device so that the probabilities are different than in FIG. 8. It is possible to detect an anomaly event even if the number of sessions is less than a given window size (e.g., 3). For example, an anomaly is detected at row 4 using the data of two rows: rows 3 and 4. The probability of an anomaly for row 4 is based on the formula of FIG. 10, the stationary probability of S3 at row 3 (SP3) and the probability of the transition from S3 to S2 at rows 3 to 4 (TP32). The probability is the square root of SP3×TP32, in one approach.

FIG. 12 is a block diagram of a processing device suitable for implementing the system and method. The computing system 1202 may include, for example, a processor 1270, random access memory (RAM) 1220, non-volatile storage 1230, a display unit (output device) 1250, an input device 1260, and a network interface device 1240. In certain embodiments, the computing system 1202 may be embedded into a personal computer, mobile computer, mobile phone, tablet, or other suitable processing device.

Illustrated in non-volatile storage 1230 are functional components which may be implemented by instructions operable to cause processor 1270 to implement one or more of the processes described below. While illustrated as part of non-volatile storage 1230, such instructions may be operate to cause the processor to perform various processes described herein using any one or more of the hardware components illustrated in FIG. 12. These functional components include a virtual machine manager and a virtual network function.

Non-volatile storage 1230 may comprise any combination of one or more computer readable media. The computer readable media may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a computer diskette, a hard disk, a random access memory (RAM), a read-only memory (ROM), an erasable programmable read-only memory (EPROM or Flash memory), an appropriate optical fiber with a repeater, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer system 1202 can include a set of instructions that can be executed to cause computer system 1202 to perform any one or more of the methods or computer based functions disclosed herein. Computer program code for carrying out operations for aspects of the present disclosure may be written in any combination of one or more programming languages, including an object oriented programming language conventional procedural programming languages. The program code may execute entirely on the computer system 1202, partly on the computer system 1202, as a stand-alone software package, partly on the computer system 1202 and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

As illustrated in FIG. 12, the computing system 1202 includes a processor 1270. A processor 1270 for computing system 1202 is configured to execute software instructions in order to perform functions as described in the various embodiments herein. A processor 1270 for a computing system 1202 may be a general purpose processor or may be part of an application specific integrated circuit (ASIC). A processor 1270 for a computing system 1202 may also be a microprocessor, a microcomputer, a processor chip, a controller, a microcontroller, a digital signal processor (DSP), a state machine, or a programmable logic device. A processor 1270 for a computing system 1202 may also be a logical circuit, including a programmable gate array (PGA) such as a field programmable gate array (FPGA), or another type of circuit that includes discrete gate and/or transistor logic. A processor 1270 for a computing system 1202 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computing system 1202 includes a RAM 1220 and a non-volatile storage 1230 that can communicate with each, and processor 1270, other via a bus 1208. Illustrated in the non-volatile storage 1230 are components a network monitor 1232 which may be utilized by the processor to create the network monitor 160 of FIG. 1, a database creator 1231 which may be utilized to create the fingerprint database 155, an anomaly detector 1234 which may be utilized by the processor to create the anomaly detector 165 of FIG. 1, analyzer 1236 which is utilized create the analyzer 170 of FIG. 1 to detect data anomalies and co-occurrence analysis, and a virtual user interface generator 1238 which is used to provide output reports. Each of the components may comprise instructions capable of causing the processor 1270 to execute steps to perform the methods discussed herein.

As shown, the computing system 1202 may further include a display unit (output device) 1250, such as a liquid crystal display (LCD), an organic light emitting diode (OLED), a flat panel display, a solid state display, or a cathode ray tube (CRT). Additionally, the imaging processor may include an input device 1260, such as a keyboard/virtual keyboard or touch-sensitive input screen or speech input with speech recognition, and which may include a cursor control device, such as a mouse or touch-sensitive input screen or pad.

Memories described herein are tangible storage mediums that can store data and executable instructions, and are non-transitory during the time instructions are stored therein. A memory described herein is an article of manufacture and/or machine component. Memories will described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

It is understood that the present technology may be embodied in many different forms and should not be construed as being limited to the embodiments set forth herein. Rather, these embodiments are provided so that this disclosure will be thorough and complete and will fully convey the technology to those skilled in the art. Indeed, the technology is intended to cover alternatives, modifications and equivalents of these embodiments, which are included within the scope and spirit of the technology as defined by the appended claims. Furthermore, numerous specific details are set forth in order to provide a thorough understanding. However, it will be clear to those of ordinary skill in the art that the embodiments may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a device, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, assign elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A device, comprising:
   a non-transitory memory storage comprising instructions; and
   one or more processors in communication with the memory, wherein the one or more processors execute the instructions to:
   obtain historical measurements of a key quality indicator for a set of user devices including a selected user device in a communication network;
   assign the historical measurements to a plurality of states, one state per historical measurement;
   determine stationary probabilities and transition probabilities of the plurality of states for the set of user devices;
   obtain additional measurements of the key quality indicator for the selected user device;
   assign the additional measurements to the plurality of states, one state per additional measurement, to provide a sequence of states; and
   for each window of multiple windows applied to the sequence of states, determine a probability of a sequence of multiple states in the window based on the stationary probabilities and the transition probabilities of the plurality of states for the set of user devices and determine whether the probability of the sequence of multiple states is consistent with an anomaly;
   determine that, among the additional measurements, an additional measurement is an anomaly based on whether the probabilities of the sequences of multiple states are consistent with the anomaly; and
   generate an indication of the anomaly.

2. The device of claim 1, wherein:
   the transition probabilities are determined using a Markov model.

3. The device of claim 1, wherein the one or more processors execute the instructions to:
   determine the stationary probabilities of each state of the plurality of states based on a number of times the historical measurements for the selected user device are assigned to the state relative to a number of the historical measurements for the selected user device.

4. The device of claim 1, wherein:
   the additional measurements are obtained over a time period which is less than a time period over which the historical measurements are obtained.

5. The device of claim 1, wherein:
   the plurality of states represent different quality levels, ranging from a lowest state which represents a lowest quality level to a highest state which represents a highest quality level.

6. The device of claim 1, wherein the historical measurements are for a plurality of user devices in the communication network, and the one or more processors execute the instructions to:
   associate the historical measurements with different times of day, such that each historical measurement is associated with one time of day;
   form clusters of times with similar historical measurements; and
   for each cluster, determine a range of the historical measurements and define the plurality of states based on the range, wherein the historical measurements of each cluster are assigned to the plurality of states which are defined for the cluster.

7. The device of claim 6, wherein the one or more processors execute the instructions to:
   for each cluster, divide the range of the historical measurements into unequal increments and define the plurality of states based on the unequal increments.

8. The device of claim 1, wherein:
   the windows are overlapping.

9. The device of claim 1, wherein:
   for each window, one of the stationary probabilities is for an initial state of the sequence of states, one or more of the transition probabilities are for reaching one or more subsequent states in the sequence of multiple states in the window, and the probability of the sequence of multiple states in the window is based on the one of the stationary probabilities and the one or more of the transition probabilities.

10. The device of claim 1, wherein:
    for each window, the probability of the sequence of multiple states in the window is based on stationary probabilities of an initial state of the sequence of states and of one or more subsequent states in the sequence of multiple states in the window.

11. The device of claim 1, wherein:
    for each window, the probability of the sequence of multiple states in the window is based on a geometric mean of probabilities of each state of the sequence of multiple states in the window.

12. A method for processing data, comprising:
    obtaining historical measurements of a key quality indicator for a set of user devices in a communication network;

assigning the historical measurements to a plurality of states, one state per measurement;
determining stationary probabilities and transition probabilities of the plurality of states for the set of user devices;
obtaining additional measurements of the key quality indicator for a selected user device;
assigning the additional measurements to the plurality of states, one state per measurement, to provide a sequence of multiple states;
determining a probability of the sequence of multiple states based on the stationary probabilities and the transition probabilities of the plurality of states for the set of user devices;
determining whether the probability of the sequence of multiple states is consistent with an anomaly and
labelling the additional measurements to indicate which of the additional measurements are consistent with the anomaly.

13. The method of claim 12, wherein:
the probability of the sequence of multiple states is based on a stationary probability of an initial state of the sequence of multiple states and a transition probability for reaching a subsequent state of the sequence of multiple states.

14. The method of claim 12, wherein the sequence of multiple states comprises an initial state and a subsequent state, the method further comprising:
in response to determining that a stationary probability of the subsequent state is less than a threshold, the determining the probability of the sequence of multiple states is based on stationary probabilities of the initial state and the subsequent state.

15. The method of claim 12, wherein the sequence of multiple states comprises an initial state and a subsequent state, the method further comprising:
in response to determining that a stationary probability of the subsequent state is greater than a threshold, the determining the probability of the sequence of multiple states is based on a stationary probability of the initial state and a transition probability for reaching the subsequent state.

16. The method of claim 12, wherein the sequence of multiple states comprises a windowed portion of a sequence of states to which the historical measurements are assigned.

17. A non-transitory computer-readable medium storing computer instructions for accessing data, that when executed by one or more processors, cause the one or more processors to perform the steps of:
obtaining measurements of a key quality indicator for a selected user device in a communication network;
assigning the measurements to a plurality of states, one state per measurement, to provide a plurality of overlapping sequences of states, wherein the plurality of states are defined based on historical measurements of the key quality indicator for a plurality of user devices in the communication network;
determining a probability of each sequence of states;
classify the probabilities in anomaly and no-anomaly clusters; and
for each sequence of states, determining whether the measurements of the key quality indicator for the selected user device represent an anomalous condition based on whether the probability for the sequence of states is classified into the anomaly or no-anomaly cluster.

18. The non-transitory computer-readable medium of claim 17, wherein:
the probability of the sequence of states is based on stationary probability of an initial state of the sequence of states and a transition probability for reaching a subsequent state of the sequence of states.

19. The non-transitory computer-readable medium of claim 17, wherein:
the probability of the sequence of states is based on stationary probabilities of an initial state of the sequence of states and of a subsequent state of the sequence of states.

20. The device of claim 1, wherein:
for each window of multiple windows applied to the sequence of states, the probability is consistent with the anomaly when the probability is relatively low and is not consistent with the anomaly when the probability is relatively high.

* * * * *